(12) United States Patent
Inoue et al.

(10) Patent No.: US 7,944,796 B2
(45) Date of Patent: May 17, 2011

(54) RECORDING APPARATUS AND INFORMATION PROCESSING APPARATUS EQUIPPED WITH THE SAME

(75) Inventors: Shouhei Inoue, Fukuoka (JP); Syougo Horinouchi, Fukuoka (JP); Hideaki Horio, Fukuoka (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 12/253,468

(22) Filed: Oct. 17, 2008

(65) Prior Publication Data
US 2009/0103154 A1 Apr. 23, 2009

(30) Foreign Application Priority Data
Oct. 18, 2007 (JP) ................................. 2007-271170

(51) Int. Cl.
*G11B 7/00* (2006.01)
(52) U.S. Cl. ................................ 369/103; 369/124.03
(58) Field of Classification Search .................... None
See application file for complete search history.

(56) References Cited

U.S. PATENT DOCUMENTS

| | | | |
|---|---|---|---|
| 7,002,891 B2 | 2/2006 | Horimai | |
| 7,130,092 B1 | 10/2006 | Horimai | |
| 7,248,389 B2 * | 7/2007 | Toishi | 359/22 |
| 7,595,923 B2 * | 9/2009 | Gabor et al. | 359/29 |
| 7,848,204 B2 * | 12/2010 | Lan et al. | 369/103 |
| 2005/0002311 A1 * | 1/2005 | Ichihara et al. | 369/103 |
| 2005/0270957 A1 * | 12/2005 | Roh | 369/112.16 |
| 2007/0103757 A1 | 5/2007 | Kubara et al. | |
| 2007/0140091 A1 * | 6/2007 | Lin et al. | 369/103 |
| 2007/0285456 A1 | 12/2007 | Takasu et al. | |
| 2007/0291083 A1 | 12/2007 | Gyoutoku et al. | |
| 2008/0024563 A1 | 1/2008 | Matsui et al. | |
| 2008/0043596 A1 * | 2/2008 | Noguchi et al. | 369/103 |
| 2008/0192608 A1 * | 8/2008 | Bates et al. | 369/103 |
| 2008/0211880 A1 | 9/2008 | Hara et al. | |

FOREIGN PATENT DOCUMENTS

| | | |
|---|---|---|
| JP | 2002-123949 | 4/2002 |
| JP | 2003-178462 | 6/2003 |

OTHER PUBLICATIONS

English language Abstract of JP 2002-123949, Apr. 26, 2002.
English language Abstract of JP 2003-178462, Jun. 27, 2003.

* cited by examiner

*Primary Examiner* — Paul Huber
(74) *Attorney, Agent, or Firm* — Greenblum & Bernstein P.L.C.

(57) ABSTRACT

A recording apparatus includes a first light source irradiating first laser light, a second light source irradiating second laser light, an optical spatial modulating unit applying information to the first laser light, and an objective lens collecting the first laser light and the second laser light at different positions on the same optical axis. A hologram recording operation uses a first optical path and a second optical path. The information light is conducted to the objective lens along the first optical path. The reference light is conducted to the objective lens along the second optical path. At the same time, an address/servo control operation is carried out by employing a third optical path along which the second laser light is conducted to the objective lens. The DVD recording operation uses the second optical path. The CD recording operation uses the third optical path.

17 Claims, 22 Drawing Sheets

RECORDING APPARATUS AND INFORMATION PROCESSING APPARATUS EQUIPPED WITH THE SAME

BACKGROUND

The present invention relates to a recording apparatus for performing hologram recording operation, which has compatibility with respect to bit-by-bit recording operation corresponding to the conventional optical disk recording system, and also, relates to an information processing appliance equipped with the hologram recording apparatus.

Conventionally, this sort of hologram recording apparatuses try to realize compatibility with respect to bit-by-bit recording operations by employing any one of optical paths of information light and optical paths of reference light, which are employed in hologram recording operations, as optical paths of bit-by-bit recording operations.

While the compatibility is tried to be realized, in address/servo control operations when hologram recording operations are carried out, reflection light reflected from optical disks, which is required for the address/servo control operations, is derived from the same light source as the light source for the hologram recording operations via either the optical paths of the information light or the optical paths of the reference light when the hologram recording operation is carried out.

Among hologram recording apparatuses having the compatibility with respect to the bit-by-bit recording operations, for instance, there are two different types of hologram recording apparatuses: That is, one type of hologram recording apparatuses perform both address/servo control operations and bit-by-bit recording operations by employing optical paths of reference light when hologram recording operations are carried out (refer to, for example, patent document 1), whereas the other type of hologram recording apparatuses perform both address/servo control operations and bit-by-bit recording operations by employing optical paths of information light when hologram recording operations are carried out (refer to, for instance, patent document 2).

[Patent document 1] JP-A-2002-123949
[Patent document 2] JP-A-2003-178462

However, in the above-described conventional techniques, there are the below-mentioned problems.

That is, as previously described, the address/servo control operation when the hologram recording operation is carried out has the following problem That is, the light which is employed in the address/servo control operation is derived from the light source for the hologram recording operation and the address/servo control operation is carried out via either the optical path of the information light or the optical path of the reference light when the hologram recording operation is carried out, so that both the hologram recording operation and the address/servo control operation cannot be executed at the same time, and therefore, the hologram recording operation and the servo control operation must be alternately carried out.

Also, in order to alternately perform the hologram recording operation and the address/servo control operation, both a hologram recording area and an address/servo area are provided in a hologram recording medium, so that the entire area of the hologram recording medium cannot be utilized in hologram recording operations, and thus, the entire recording area cannot be effectively utilized.

SUMMARY

As a consequence, the present invention is made to solve the above-described problems, and therefore, has an object to provide a recording apparatus and an information processing appliance equipped with the recording apparatus. That is, in the case of a hologram recording operation, even while the hologram recording operation is being carried out, the recording apparatus is capable of continuously performing address/servo control operation by employing a light source which is different from a light source for a hologram recording operation; while recording precision is improved, the recording apparatus can utilize a recording medium in a maximum efficiency; and also, the recording apparatus is capable of employing both the hologram recording-purpose light source and the separately provided light source as a light source for a bit-by-bit recording operation by utilizing an optical path when the hologram recording operation is carried out.

In order to achieve the above object, according to the present invention, there is provided a recording apparatus for recording interference fringes on a recording medium by interfering information light with reference light, comprising:

a first light source which irradiates first laser light for a DVD recording operation;

a second light source which irradiates second laser light for a CD recording operation;

an optical spatial modulating unit which applies information to the first laser light; and an objective lens which collect the first laser light and the second laser light at different positions on the same optical axis, wherein in case of a hologram recording operation, the hologram recording operation is carried out by employing a first optical path and a second optical path, information light to which the information is applied via the optical spatial modulating unit is produced from the first laser light and the produced information light is conducted to the objective lens along the first optical path, and reference light is produced without routing the optical spatial modulating unit from the first laser light and the produced reference light is conducted to the objective lens along the second optical path, and at the same time, an address/servo control operation is carried out by employing a third optical path along which the second laser light is conducted to the objective lens;

wherein in case of the DVD recording operation, the DVD recording operation is carried out by employing the second optical path; and wherein in case of the CD recording operation, the CD recording operation is carried out by employing the third optical path.

According to the present invention, there is also provided a recording apparatus for recording interference fringes on a recording medium by interfering information light with reference light, comprising:

a first light source which irradiates first laser light for a DVD recording operation;

a second light source which irradiates second laser light for a CD recording operation;

an optical spatial modulating unit which applies information to the first laser light; and an objective lens which collect the first laser light and the second laser light at different positions on the same optical axis, wherein in case of a hologram recording operation, the hologram recording operation is carried out by employing a first optical path and a second optical path, information light to which the information is applied via the optical spatial modulating unit is produced from the first laser light and the produced information light is conducted to the objective lens along the first optical path, and reference light is produced without routing the optical spatial modulating unit from the first laser light and the produced reference light is conducted to the objective lens along the second optical path, and at the same time, an address/servo control operation is carried out by employing a third optical path along which the second laser light is conducted to the objective lens;

wherein in case of the DVD recording operation, the DVD recording operation is carried out by employing the first optical path; and wherein in case of the CD recording operation, the CD recording operation is carried out by employing the third optical path.

In accordance with the present invention, in the recording apparatus having compatibility with at least the hologram recording operation, the DVD recording operation, and the CD recording operation, the objective lens is employed which collects the first laser light irradiated from the first light source and the second laser light irradiated from the second light source on the different positions on the same optical axis. As a result, the layer of the recording medium for the hologram recording operation can be provided at such a different position from the layer of the recording medium where the address/servo control operation-purpose groove is formed. Accordingly, when the hologram recording operation is carried out, even while the hologram recording operation is performed, the address/servo control operation can be continuously carried out. As a result, while the recording precision can be improved, the recording medium can be utilized in a maximum utilizing efficiency.

Also, the first light source for the DVD recording operation is employed when the hologram recording operation is carried out, and on the other hand, when the DVD recording/reproducing operation is carried out, the second optical path is employed which is established not via the optical spatial modulating unit employed in the hologram recording operation. As a consequence, while the light source is defined as a starting point, the optical paths used in the recording operations are commonly utilized in the DVD recording operation and the hologram recording operation, so that such a recording/reproducing apparatus can be readily realized. That is, the recording/reproducing apparatus has compatibility capable of commonly utilizing the optical system, while there are many optical systems which can be commonly utilized in the hologram recording operation and the DVD recording operation. As a result, even in a recording/reproducing apparatus capable of realizing both a hologram recording operation and a DVD recording operation by employing optical paths for two systems (namely, information light and reference light), the entire recording/reproducing apparatus can be largely made compact, as compared with such a case that both the hologram recording operation and the DVD recording operation are realized by employing separate optical systems.

Moreover, when the hologram recording operation is carried out, the second laser light irradiated from the second light source for the CD recording purpose is employed so as to perform the address/servo control operation for the hologram recording operation. On the other hand, when the CD recording operation is carried out, such an optical path is utilized which is employed when the address/servo control operation of the hologram recording operation is carried out. As a consequence, the optical path used in the CD recording operation and the optical path used in the address/servo control operation for the hologram recording operation are commonly used. As a result, the recording/reproducing apparatus has compatibility capable of commonly utilizing the optical system, while there are many optical systems which can be commonly utilized in the hologram recording operation and the CD recording operation. As a result, even in a recording/reproducing apparatus capable of realizing both a hologram recording operation and a CD recording operation by employing optical paths for two systems (namely, information light and reference light), the entire recording/reproducing apparatus can be largely made compact, as compared with such a case that both the hologram recording operation and the CD recording operation are realized by employing separate optical systems.

Also, while the second optical path routed not via the optical spatial modulating unit is employed as the optical path to be commonly utilized, since the laser light does not pass through such an optical member which is not required in the DVD recording operation, it is possible to eliminate loss and noise of the laser light, which are produced when the DVD recording operation is performed via the optical spatial modulating unit.

Also, in the recording apparatus having compatibility with at least the hologram recording operation, the DVD recording operation, and the CD recording operation, the objective lens is employed which collects the first laser light irradiated from the first light source and the second laser light irradiated from the second light source on the different positions on the same optical axis. As a result, the layer of the recording medium for the hologram recording operation can be provided at such a different position from the layer of the recording medium where the address/servo control operation-purpose groove is formed. Accordingly, when the hologram recording operation is carried out, even while the hologram recording operation is being performed, the address/servo control operation can be continuously carried out. As a result, while the recording precision can be improved, the recording medium can be utilized in a maximum utilizing efficiency.

Also, when the hologram recording operation is carried out, the first light source for the DVD recording purpose is employed. On the other hand, when the DVD recording operation is carried out, the first optical path employed in the hologram recording operation is employed. As a consequence, while the light source is defined as a starting point, the optical paths used in the recording operations are commonly utilized in the DVD recording operation and the hologram recording operation, so that such a recording/reproducing apparatus can be readily realized. That is, the recording/reproducing apparatus has compatibility capable of commonly utilizing the optical systems in a high efficiency, while there are many optical systems which can be commonly utilized in the hologram recording operation and the DVD recording operation. As a result, even in a recording/reproducing apparatus capable of realizing both a hologram recording operation and a DVD recording operation by employing optical paths for two systems (namely, information light and reference light), the entire recording/reproducing apparatus can be largely made compact, as compared with such a case that both the hologram recording operation and the DVD recording operation are realized by employing separate optical systems.

Moreover, when the hologram recording operation is carried out, the second laser light irradiated from the second light source for the CD recording purpose is employed so as to perform the address/servo control operation for the hologram recording operation. On the other hand, when the CD recording operation is carried out, such an optical path is utilized which is employed when the address/servo control operation of the hologram recording operation is carried out. As a consequence, the optical path used in the CD recording operation and the optical path used in the address/servo control operation for the hologram recording operation are commonly used. As a result, the recording/reproducing apparatus has compatibility capable of commonly utilizing the optical system, while there are many optical systems which can be commonly utilized in the hologram recording operation and the CD recording operation. As a result, even in a recording/reproducing apparatus capable of realizing both a hologram recording operation and a CD recording operation by employing optical paths for two systems (namely, information light and reference light), the entire recording/reproducing apparatus can be largely made compact, as compared with such a case that both the hologram recording operation and the CD recording operation are realized by employing separate optical systems.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION

Referring now to drawings, a description is made various embodiments of the present invention.

Embodiment 1

Figure 1:
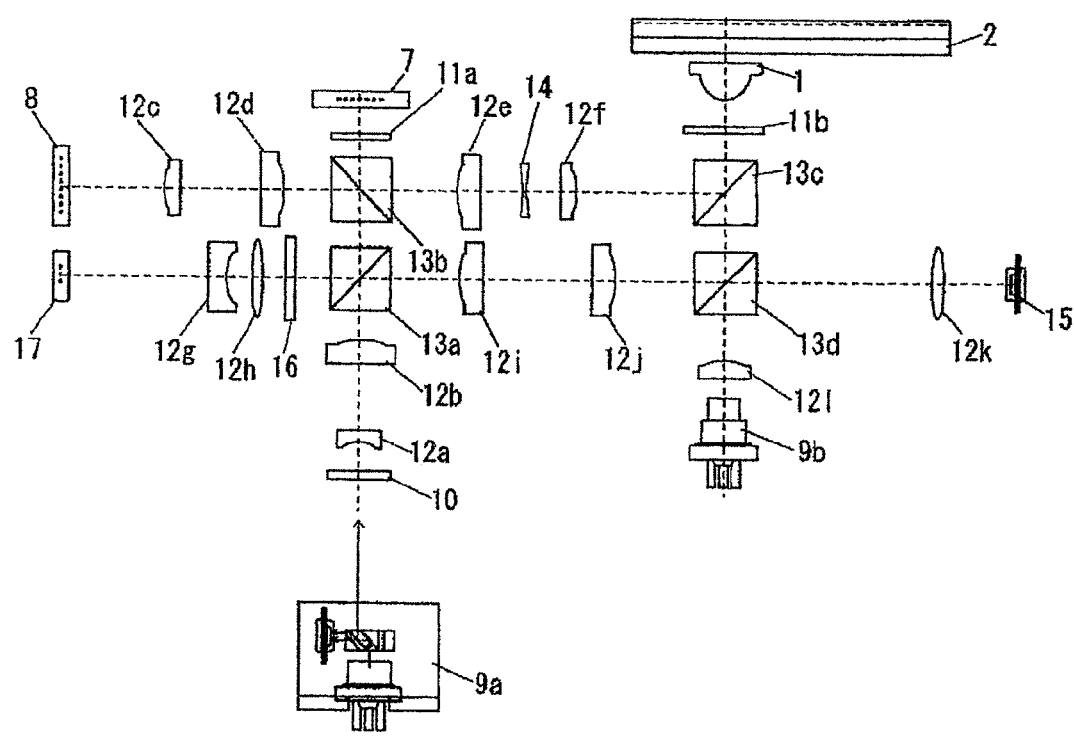
FIG. 1 is a diagram for showing an optical system arrangement of a hologram recording/reproducing apparatus having compatibility with bit-by-bit recording/reproducing operation such as a CD and a DVD.

FIG. 1 is a diagram for schematically showing an optical system arrangement of a hologram recording/reproducing apparatus having compatibility with respect to bit-by-bit recording/reproducing operations such as CDs and DVDs, according to an embodiment 1 of the present invention, namely, FIG. 1 represents one example of an optical disk drive. The optical disk drive is arranged by an objective lens 1; a recording medium 2; an optical spatial modulator (will be referred to as "SLM" hereinafter) 7; an imaging element (CCD camera, or CMOS camera) 8, a DVD-purpose laser light source 9a which oscillates laser light having a wavelength of approximately 650 nm; a CD-purpose laser light source 9b which oscillates laser light having a wavelength of approximately 780 nm; a liquid crystal half wavelength plate (will be referred to as "L.C.HWP" hereinafter) 10; a quarter wavelength plate (will be referred to as "QWP" hereinafter) 11; a beam expander 12; a polarization beam splitter (will be referred to as "PBS" hereinafter) 13, a pin hole 14; a front light monitor 15 for sensing light amount of laser light a transmission type diffraction optical element 16; a photodetector IC (PDIC) 17 for detecting a plurality of laser light, and the like.

In this case, in accordance with the above-described L.C. HWP 10, a phase difference between linear polarized light whose polarization directions are intersected to each other at a right angle can be set to 180 degrees; and a ratio of the polarization light components can be arbitrarily set; conversions can be turned ON/OFF; and polarization components of light emitted from the DVD-purpose laser light source 9a can be set to an arbitrary ratio.

Also, the PBS (polarization beam splitter) 13 reflects and transmits both S-polarized light and P-polarized light at an arbitrary ratio therebetween, while the S-polarized light and the P-polarized light correspond to polarized light components of DVD-purpose laser light and CD-purpose laser light.

With respect to DVD-purpose laser light, in the above-described PBS 13, a PBS 13a and another PBS 13b are designed so as to reflect S-polarized light and transmit P-polarized light; a PBS 13c is designed so as to transmit both the S-polarized light and the P-polarized light by 50%, and also, to reflect both the S-polarized light and the P-polarized light by 50%; and another PBS 13d is designed so as to transmit the S-polarized light by 10% and reflect this S-polarized light by 90%, and also, to reflect the P-polarized light.

Also, with respect to the CD-purpose laser light, in accordance with the PBS 13, both the PBS 13a and the PBS 13c are designed so as to transmit both S-polarized light and P-polarized light; and, the PBS 13c is designed so as to reflect the S-polarized light by 10% and to transmit the S-polarized light by 90%, and also to reflect the P-polarized light.

It should be understood that the ratios of the above-described transmissions and reflections may be arbitrarily set, namely, may be properly determined based upon an optical system to be arranged, and therefore, are not limited only to the above-described ratios.

Figure 2:
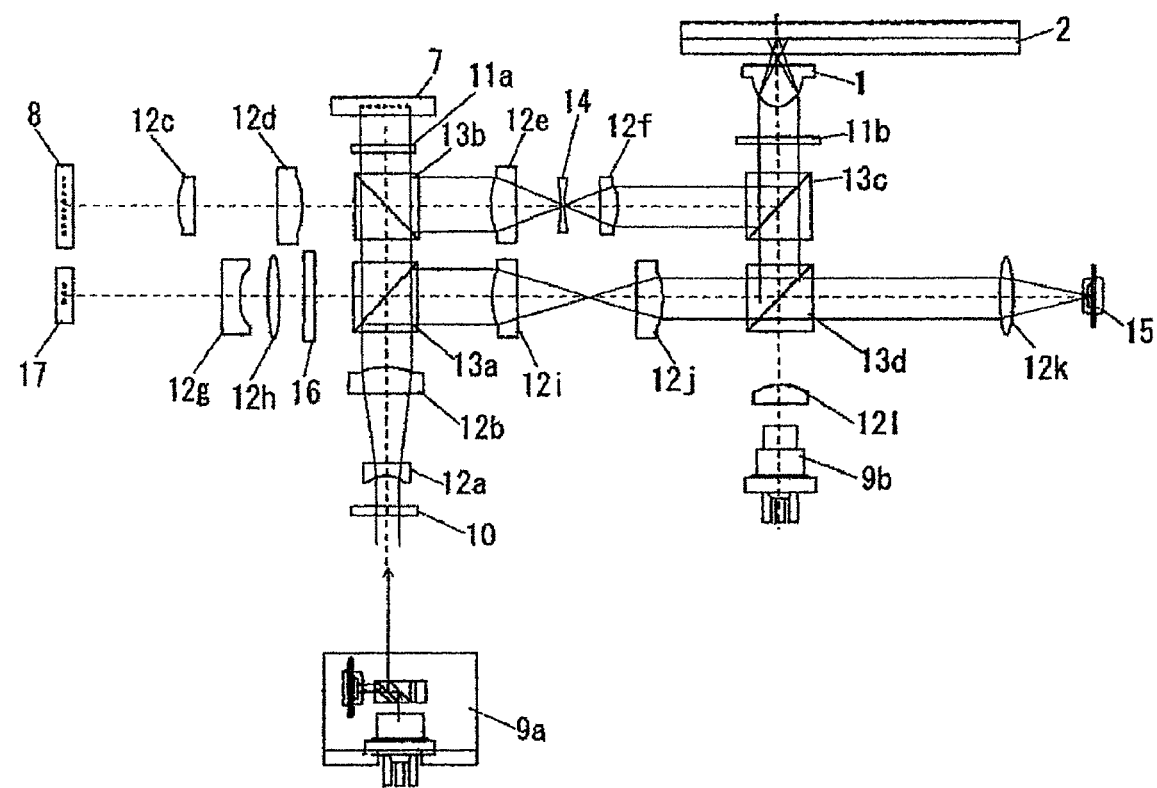
FIG. 2 is a diagram for representing an optical system and optical axes, which are used in a hologram recording operation.

With respect to the hologram recording/reproducing apparatus having the above-described arrangement, a description is made of operations when data is recorded on the recording medium 2 with reference to FIG. 2. FIG. 2 is a diagram for representing an optical system and optical axes which are employed when a hologram recording operation is carried.

In this case, when the data is recorded on the recording medium 2, the DVD-purpose laser is employed. The light emitted from the DVD-purpose laser light source 9a is converted into both S-polarized light and P-polarized light by the L.C. HWP 10; the S-polarized light and the P-polarized light are separated via the PBS 13a along two directions; the light reflected by the PBS 13a is utilized as reference light when a hologram recording operation is carried out; and also, the light passed through the PBS 13a is utilized as information light when the hologram recording operation is carried out.

Firstly the information light constructed of the P-polarized light passes through the PBSs 13a and 13b, and then is conducted to the SLM 7. In this case, since the information light passes through the QWP 11a, this information light is converted from the P-polarized light into circularly polarized light.

When the information light corresponding to the above-described circularly polarized light is reflected on the SLM 7, at the same time, recording data is applied to the reflected circularly polarized light, the data-applied circularly polarized light is reflected, and thereafter, the data-applied light is again converted from the circularly polarized light to S-polarized light by the QWP 11a.

As a result, when the information light is reflected by the SLM 7, at the same time, the recording data is applied to the information light so that such an information light having the hologram recording data can be produced.

The information light having the recording data, which is converted to the S-polarized light is reflected by the PBS 13b, and the reflected information light is enlarged, or collected by lenses 12e and 12f; while the pin hole 14 is formed at a focal point of the information light collected by the lens 12e, unwanted light produced by diffraction occurred on the SLM 7 is not collected at the position of the pin hole 14, so that the unwanted light is cut and only the information light can be conducted.

As a consequence, since the pin hole 14 is formed at the focal position of the information light collected by the lens 12e, the unwanted laser light such as scattered light whose focal point is different from that of the information light can be cut off, and only the information light having the recording data can be conducted to the optical path, so that the hologram recording operation can be correctly carried out.

Thereafter, the information light corresponding to the S-polarized light is reflected on the PBS 13c, and the reflected information light is conducted to the QWP 11b.

On the other hand, the reference light made of the S-polarized light is reflected on the PBS 13a, and thereafter, the reflected reference light is diffused, or collected by lenses 12i and 12j, while a spot size of the light source light entered to the PBS 13d is changed into a proper dimension.

A partial light portion of the reference light entered to the PBS 13d passes through this PBS 13d, and the remaining light portion thereof is reflected by this PBS 13d. The penetrated reference light is collected by a lens 12k, and a light amount of the collected reference light is read by the front light monitor 15, and then, the read light amount is employed so as to control a light amount of the light source 9a. The reference light reflected on the PBS 13d passes through the PBS 13c, and then, is conducted to the QWP 11b. The information light and the reference light which are conducted to the QWP 11b pass through the same optical path, and the laser light is converged in such a manner that the reference light takes a focal position on the side of the incident plane of the recording medium 2, as compared with the information light.

Thereafter, the information light and the reference light are converted from the S-polarized light into the circularly polarized light by the QWP 11b, and then, the circularly polarized light is collected by the objective lens 1 onto the recording medium 2 so as to form a hologram.

Figure 3:
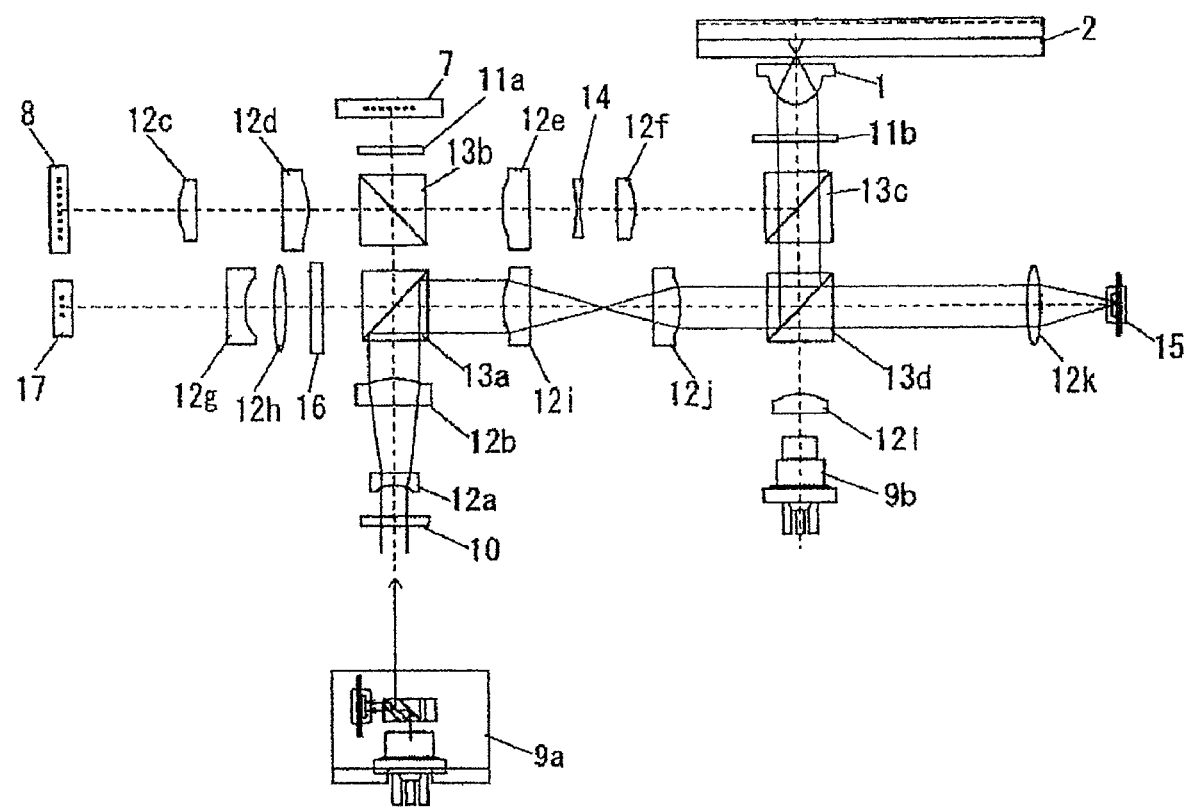
FIG. 3 is a diagram for showing an optical system and optical axes of a going path, which are used when information recorded on hologram is reproduced.
Figure 4:
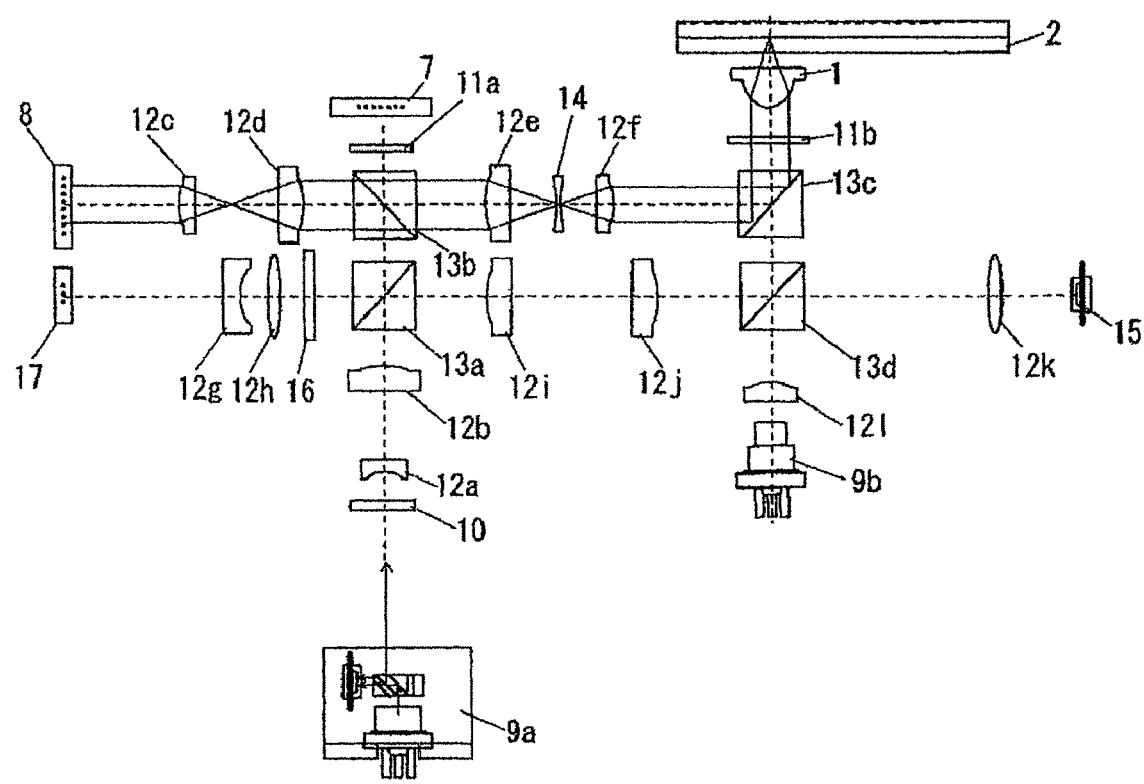
FIG. 4 is a diagram for showing an optical system and optical axes of a returning path, which are used when information recorded on hologram is reproduced.

Next, FIG. 3 and FIG. 4 indicate operations when information recorded on the recording medium 2 is reproduced. FIG. 3 is a diagram for showing an optical system and optical axes of a going path when information recorded on the hologram is reproduced. FIG. 4 is a diagram for showing an optical system and optical axes of a returning path when the information recorded on the hologram is reproduced.

Firstly, in FIG. 3, laser light corresponding to the S-polarized light is oscillated from the light source 9a. Since the oscillated laser light passes through the L.C. HWP 10 under OFF status, the laser light is left under the S-polarized light. This S-polarized laser light is reflected on the PBS 13a, and the reflected laser light is traveled to the recording medium 2 while passing though the optical path of the reference light when the hologram recording operation is performed.

As a consequence, the oscillated laser light can be directly utilized as the reference light, so that information can be easily read out.

Then, the laser light reflected on the PBS 13a passes through the QWP 11b so as to be converted into circularly polarized light, and thereafter, the reference light collected by the objective lens 1 is entered to the hologram recording layer 3b; when the entered reference light is reflected on a CD-light transmission/DVD-light reflection film 3a, at the same time, the entered reference light is diffracted on the inference fringes, so that reproduction light having information recorded on the interference region is generated.

As shown in FIG. 4, thereafter, since the reproduction light passes through the QWP 11b, the reproduction light is converted from the circularly polarized light to P-polarized light, and then, this P-polarized light is reflected on the PBS 13c; reproduction light derived from another interference plane recorded on a hologram recording layer 3b is cut off by the pin hole 14 in a similar manner to that when the hologram recording operation is carried out so as to conduct only such a target reproduction light to the PBS 13b.

As a consequence, since the pin hole 14 is installed at the focal position of the reproduction light collected by the lens 128, such a reproduction light derived from another hologram whose focal point is different from that of the relevant reproduction light is cut off, and only the relevant reproduction light can be conducted, so that the quality of the reproduction light can be improved.

The above-described relevant reproduction light passes through the PBS 13b, and then, passes through the lenses 12c and 12d so as to have a proper beam diameter, and thereafter, the resulting reproduction light is conducted to the imaging element 8.

Thereafter, the information contained in the reproduction light conducted to the imaging element 8 is read by the imaging element 8.

As previously described, in the hologram reproducing operation, when the reproduction light is reflected on the CD-light transmission/DVD-light reflection layer 3a which is provided on a bottom plane of the hologram recording layer 3b contained in the recording medium 2, this reproduction light is reflected along the same direction as that of the reference light and then is conducted to the imaging element 8. As a consequence, the optical components employed in the hologram reproducing apparatus can be arranged in an intensively collected manner along one direction, so that such a compact hologram reproducing apparatus can be readily realized.

Also, the spot sizes of the laser light can be made coincident with the necessary sizes by the plurality of lenses 12.

Further, since the optical path of the information light is arranged parallel to the optical path of the reproduction light, the extra space can be reduced, so that the compact hologram reproducing apparatus can be easily realized.

In order to realize the above-described hologram recording operation for recording the interference fringes, photosensitive materials are employed as the materials of the hologram, recording layer 3b of the recording medium 2, while a photopolymer, photorefractive crystal, a photochromium compound, and the like may be utilized.

Figure 5:
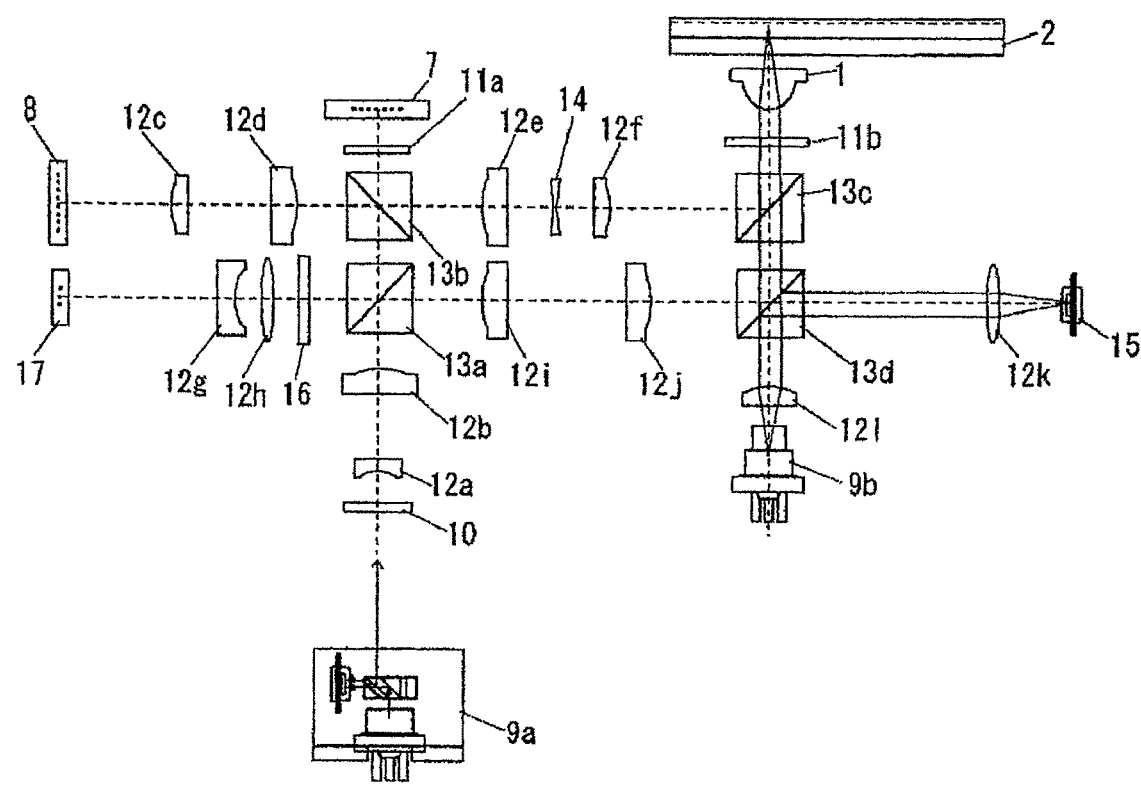
FIG. 5 is a diagram for representing an optical system and optical axes of a going path, which are used in an address/servo control operation performed at the same time when a hologram recording/reproducing operation is carried out.
Figure 6:
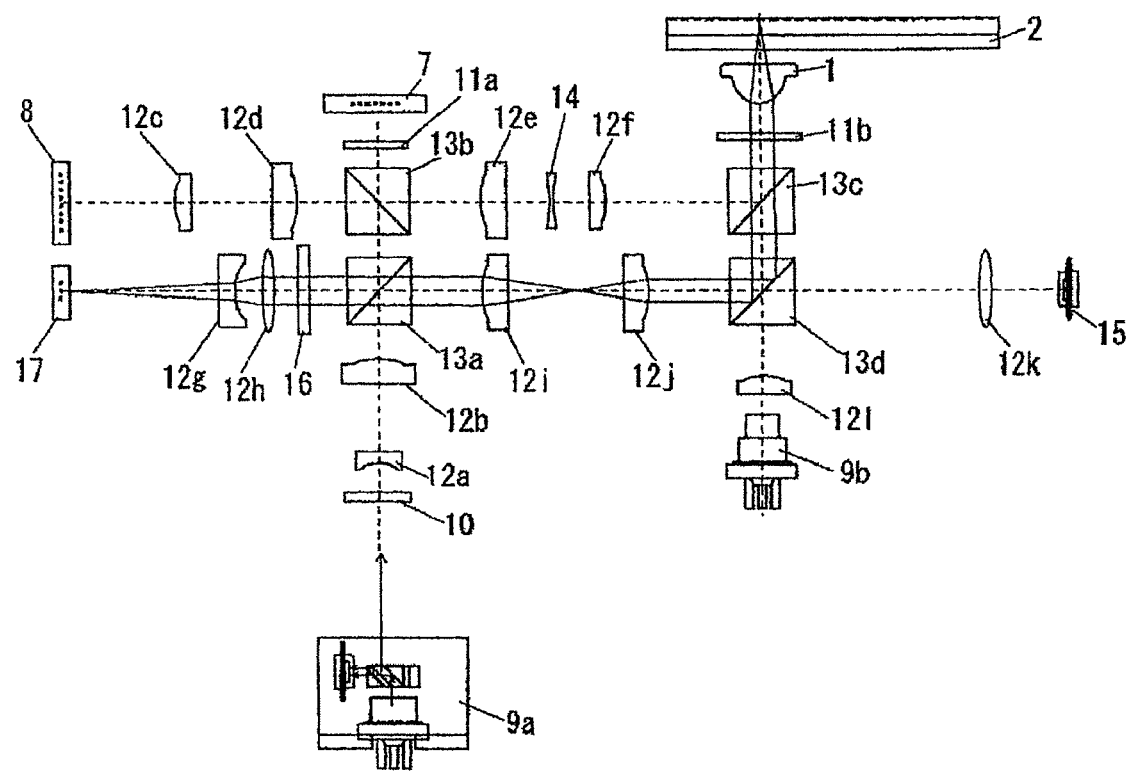
FIG. 6 is a diagram for representing an optical system and optical axes of a returning path, which are used in an address/servo control operation performed at the same time when a hologram recording/reproducing operation is carried out.

Next, when the hologram recording operation is carried out, an address/servo control operation for controlling both the recording medium 2 and a pick-up unit is required to be performed. Referring now to FIG. 5 and FIG. 6, a description is made of the address/servo control operation which is carried out at the same time during the hologram recording operation. FIG. 5 is a diagram for indicating an optical system and optical axes of a going path, which are used in address/servo control operation executed at the same time when a hologram recording/reproducing operation is carried out. FIG. 6 is a diagram for indicating an optical system and optical axes of a returning path, which are used in the address/servo control operation executed at the same time when the hologram recording/reproducing operation is carried out.

In FIG. 5, in order to execute the address/servo control operation, such a laser light of CD-purpose S-polarized light is oscillated from the light source 9b; the oscillated laser light is conducted via a lens 121 to the PBS 13d, and a partial light portion of this laser light is reflected on the PBS 13d; the reflected laser light is conducted via the lens 12k to the front light monitor 15; and then, a light amount of the light source 9b is controlled based upon a light amount read by the front light monitor 15.

On the other hand, such a laser light which has passed through the PBS 13d passes through the PBS 13c; the S-polarized laser light which has passed through the PBS 13c is converted into circularly polarized light by the QWP 11b; and then, the circularly polarized light is collected by the objective lens 1 onto the bottom plane of the recording medium 2.

As represented in FIG. 6, the laser light which is collected in the above-described manner is reflected on the reflection film provided on the rear plane of the recording medium 2; the reflected laser light is converted into P-polarized light by the QWP 11b; the P-polarized laser light passes through the PBS 13c, is reflected on the PBS 13d, and then, is processed by the lenses 12j and 12i so as to form a proper beam diameter thereof; and thereafter, the beam-processed P-polarized light is conducted via the PBS 13a to the transmission type diffraction optical element 16.

Thereafter, the laser light is subdivided into a plurality of laser light by the transmission type diffraction optical element 16, and the plurality of laser light are collected by the lenses 12h and 12g to the PDIC 17. Various sorts of address/servo control operations are carried out based upon laser light read by this PDIC 17.

As a consequence, since the laser light reflected on the recording medium 2 from the laser light of the light source 9b is read by the PDIC 17, the position of the recording medium 2 can be corrected. In the case of the hologram recording operation, even when the hologram recording operation is being carried, the address/servo control operation can be continuously carried out. As a result, a recording medium can be utilized in a maximum effective manner while recording precision is improved.

In this embodiment 1, the DVD-purpose laser light source 9a is employed in the hologram recording/reproducing operation, whereas the CD-purpose laser light source 9b is employed in the address/servo control operation. Referring now to FIGS. 7A to 7F, a description is made of a merit in such a case that when the address/servo control operation is carried out at the same time during the hologram recording/reproducing operation, the DVD-purpose laser light source 9a is utilized in the hologram recording/reproducing operation, and the CD-purpose light source 9b is utilized in the address/servo control operation. FIGS. 7A to 7F are diagrams for showing such a merit that the DVD laser light is employed in the hologram recording/reproducing operation, and the CD laser light is employed in the address/servo control operation.

A first description is made of such a merit that the DVD-purpose laser light source 9a is employed in the hologram recording/reproducing operation, and the CD-purpose laser light source 9b is employed in the address/servo control operation. Considering compatibility as to the conventional bit-by-bit recording operation, a Blue-ray Disk (will be referred to as "BD" hereinafter) light source, corresponding to blue laser light; a DVD-purpose light source; and a CD-purpose light source may be conceived as the hologram-purpose light source. Firstly, FIG. 7E and FIG. 7F represent in such a case that the BD-purpose light source is employed in a hologram recording operation.

Figures 7A, 7B, 7C, 7D:
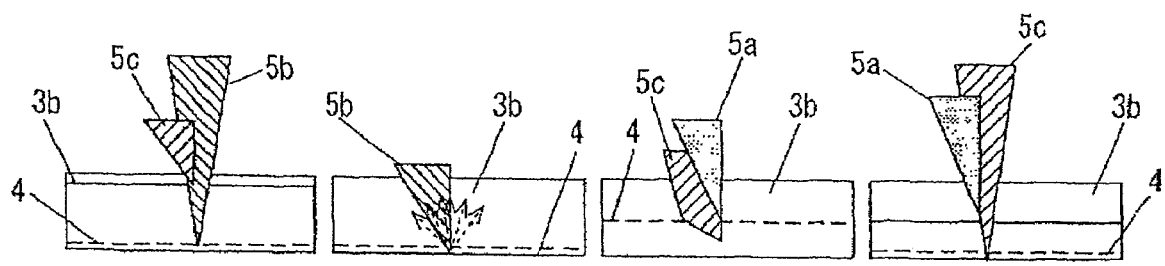
FIGS. 7A to 7F are diagrams for showing such a merit that DVD light is employed in the hologram recording/reproducing operation, and CD light is employed in the address/servo control operation.
Figures 7E, 7F:
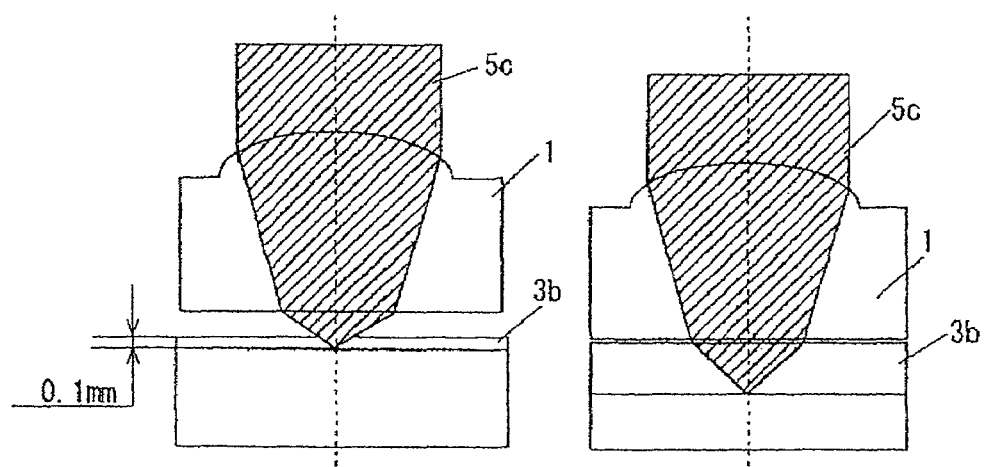

In FIG. 7E, in the BD recording operation, since a recording/reflecting plane is located at a position of 0.1 mm from a surface of an optical disk, when the hologram recording operation is carried out by employing BD light 5c and a BD-purpose objective lens, the hologram recording operation can be limitedly performed only with a thickness range of 0.1 mm. As a result, it is practically difficult to realize a large storage capacity by the hologram recording operation.

Also, since the BD light 5c can be hardly collected to a deep position in the BD-purpose object lens, as represented in FIG. 7F, if a thickness of a hologram recording layer 3b is made larger than, equal to 0.1 mm, and then, a hologram recording operation is carried out, then a distance between the recording medium 2 and the objective lens 1 must be decreased (shown in FIG. 7F), as compared with that of the BD recording operation. As a consequence, there is such a risk that the objective lens 1 may collide with the recording medium 2 due to outer disturbance such as shock given from an external source.

Next, FIG. 7A and FIG. 7B represent such a case that the CD-purpose laser light source is utilized in a hologram recording operation. Different from the case where the above-described BD light 5c is employed in the hologram recording operation, in such a case that the CD-purpose laser light 5c is employed, this CD-purpose laser light 5c is collected on a bottom plane of the hologram recording layer 3b, which is located at a position of 1.2 mm from the surface of the optical disk. As a result, the hologram recording operation can be carried out within a range of 1.2 mm, so that a large-recording capacity can be realized.

However, considering now that an address/servo control operation is carried out when the above-described hologram recording operation is performed, both the hologram recording operation and the address/servo control operation cannot be carried out at the same time. In addition, there is another risk that the laser light is reflected at random by an address/servo control-purpose groove 4 formed in the recording medium 2, and thus, the hologram cannot be correctly recorded/reproduced.

Also, in such a case where the CD-purpose light source 9b is employed in the hologram recording operation and either the DVD-purpose light source 9a or the BD-purpose light source is employed in the address/servo control operation, as indicated in FIG. 7C, the CD light passes through the address/servo control purpose groove 4 formed in the recording medium 2. As a result, since the CD light is reflected at random and is diffracted by the formed groove 4, the light collecting position is changed, the CD light can be hardly collected to a target light collecting position, so that the hologram recording/reproducing operation can be hardly carried out.

As a consequence, as shown in FIG. 7D, in accordance with the present invention, the DVD-purpose light source 9a is employed in the hologram recording operation; the CD-purpose light source 9b is employed in the address/servo control operation; and the DVD light 5a is collected on the side of the objective lens 1 rather than the light collecting position of the CD light 5b, namely, the DVD light 5a is collected on the side of the optical disk surface.

As a result, since the laser light irradiated from the DVD-purpose light source 9a is collected on the side of the objective lens 1 rather than the laser light irradiated from the CD-purpose light source 9b, the recording light can be recorded without via the address/servo control-purpose groove 4 formed in the recording medium during the hologram recording operation. As a result, in the case of the hologram recording operation, the recording light can be recorded without being adversely influenced by the address/servo control-purpose groove 4 formed in the recording medium, so that the recording precision can be furthermore improved.

In other words, while the compatibility with respect to the bit-by-bit recording operation (namely, conventional recording system) can be maintained, the hologram recording/reproducing operation can be carried out, and at the same time, the address/servo control operation can be carried out. Also, the recording capacity can be increased.

Figure 8:
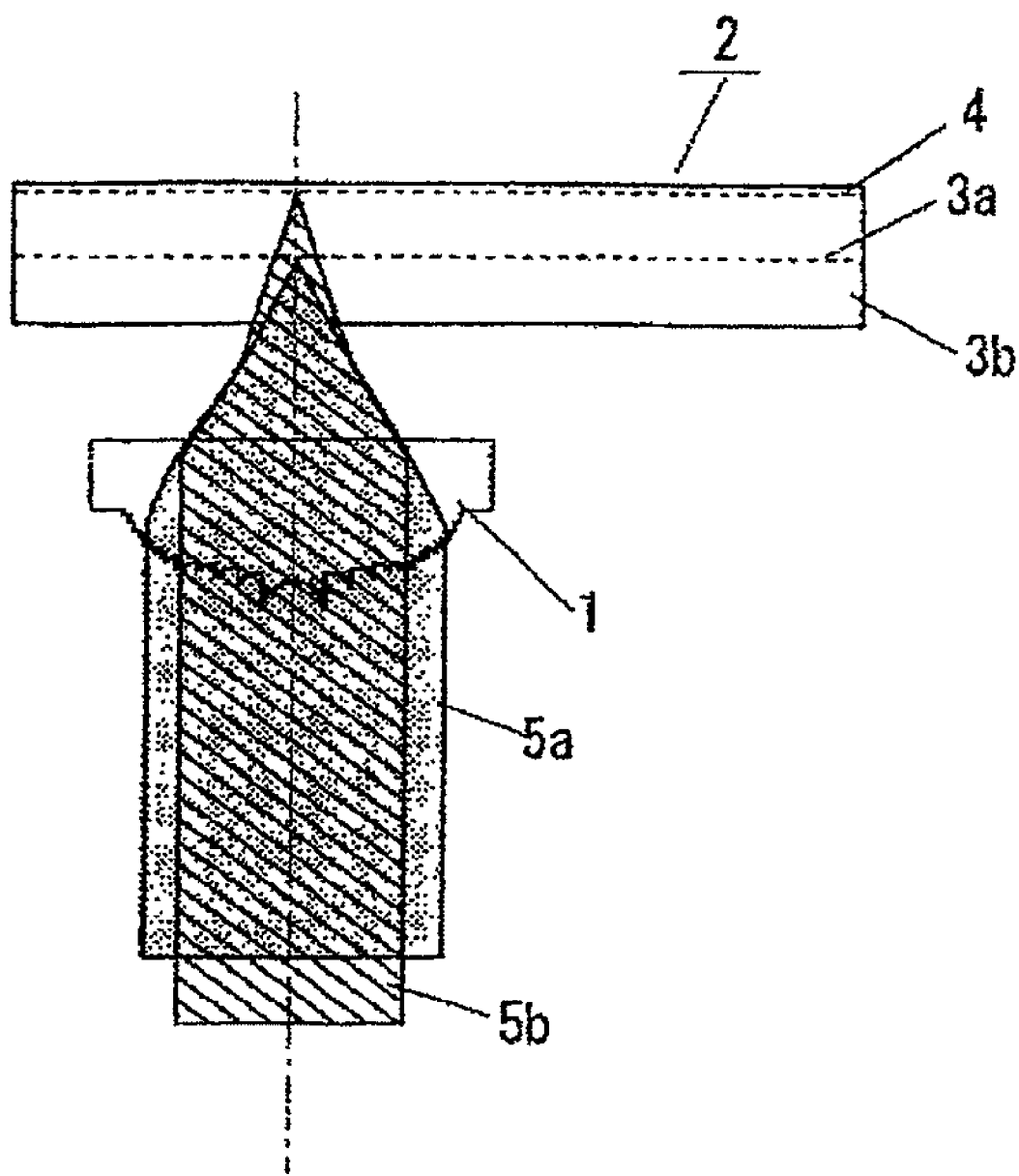
FIG. 8 is a diagram for indicating such a situation that the DVD light and the CD light are collected at different positions on the same optical axis.
Figure 9:
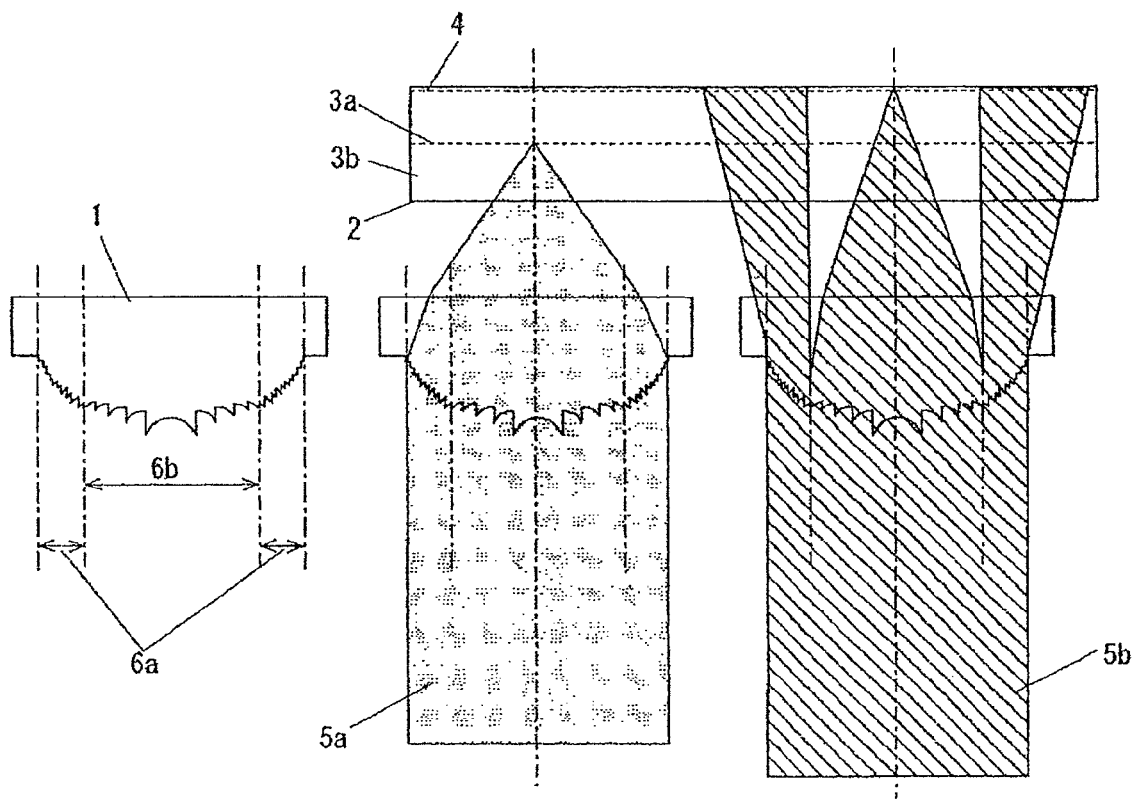
FIGS. 9A to 9C are diagrams for indicating an objective lens by which the DVD light and the CD light are collected at different positions on the same optical axis.

As previously described, in the present embodiment 1, the DVD-purpose laser light source 9a is employed in the hologram recording/reproducing operation, whereas the CD-purpose laser light source 9b is employed in the address/servo control operation. Two sets of such laser light having the different properties (namely, DVD-purpose laser light 5a and CD-purpose laser light 5b) are collected to the same recording medium. As a consequence, the objective lens 1 must be devised. In this connection, structures of objective lenses employed in this embodiment 1 will now be described with reference to FIG. 8 and FIGS. 9A to 9C. FIG. 8 is a diagram for representing such a situation that DVD light and CD light are collected at different positions on the same optical axis. FIGS. 9A to 9C are diagrams for showing an objective lens which causes the DVD light and the CD light to be collected at the different positions on the same optical axis.

FIG. 8 represents a situation near the objective lens 1 which is employed in a hologram recording/reproducing operation, an address/servo control operation, a DVD recording/reproducing operation, and a CD recording/reproducing operation. The above-described objective lens 1 is designed in such a manner that a focal distance of this objective lens 1 can be changed depending upon a wavelength of incident light, and the DVD-purpose light 5a is focused on such a focal point which is located near the objective lens 1 rather than the focal position of the CD-purpose light 5b. As a consequence, when the hologram recording/reproducing operation is carried out, while the CD-purpose light 5b can be collected to the address/servo control-purpose groove 4 formed in the bottom plane of the recording medium 2, at the same time, the DVD-purpose light 5a can be collected to the side of the objective lens 1 rather than the bottom plane of the recording medium 2. As a result, the hologram recording/reproducing operation can be carried out while the address/servo control operation is carried out. At this time, a CD light transmission/DVD light reflection film 3a capable of reflecting the DVD-purpose light 5a and capable of transmitting the CD-purpose light 5b is provided within the recording medium 2.

As shown in FIG. 9A, the above-described object lens 1 has contained a first refraction region 6a and a second refraction region 6b. A first diffraction grating which diffracts laser light entered from the CD-purpose light source 9b is formed in the first refraction region 6a, whereas a second diffraction grating which diffracts laser light entered from the DVD-purpose light source 9a is formed in the second refraction region 6b. As shown in FIG. 9B and FIG. 9C, the laser light which has passed through the second refraction region 6b from the CD-purpose light source 9b is collected without being influenced by the second diffraction grating. On the other hand, the laser light which has passed through the second refractive region 6b from the DVD-purpose light source 9a is diffracted by the second diffraction grating to become diffraction light, and this diffraction light is collected on the side of the objective lens 1 rather than the light collecting position of the laser light which has passed through the second refraction region 6b from the CD-purpose light source 9b.

As a consequence, the plural pieces of laser light having the different wavelengths, which are entered by the second diffraction grating into the same objective lens 1, are collected at the different positions on the same optical axis. In the hologram recording operation, even when the recording operation is being carried out, the address/servo control operation can be continuously carried out. As a result, while the recording precision can be improved, the recording medium can be utilized in the maximum efficiency.

Also, as shown in FIG. 9B, a refractive index of the second refraction region 6b is set in such a manner that laser light which has passed through the first diffraction region 6a from the DVD-purpose light source 9a is collected without being influenced by the first diffraction grating in accordance with a refractive index of the first refraction region 6a to the same position as such a position where this laser light which has passed through the second refraction region 6b from the DVD-purpose light source 9a is collected by being influenced by the influence of the second diffraction grating.

As a consequence, the laser light which has passed the first refraction region 6a from the DVD-purpose light source 9a is collected to the same position as the position where the laser light which has passed the second refraction region 6b from the DVD-purpose light source 9a is collected. As a result, since both the laser light which has passed through the first refraction region 6a and the laser light which has passed through the second refractive region 6b from the DVD-purpose light source 9a are utilized, the power of the laser light during the recording operation can be improved.

Also, as shown in FIG. 9C, the laser light which has passed through the first refraction region 6a from the CD-purpose light source 9b becomes diffraction light by the first diffraction grating, and this diffraction light is diffused and is not collected.

As a consequence, the laser light collected from the CD-purpose light source 9b becomes only such a laser light which has passed the second refraction region 6b and is collected in accordance with the refractive index of the second refraction region 6b, and the laser light collected from the CD-purpose light source 9b becomes uniform during the CD recording operation, so that the recording precision can be improved.

As previously described, the objective lens 1 causes the DVD light 5a and the CD light 5b to have the different focal distances, and also, both the DVD light 5a and the CD light 5b are not oscillated from the same light source, but are oscillated from the different light sources 9a and 9b. Accordingly, the hologram recording/reproducing operation, and the address/servo control operation required for this hologram recording/reproducing operation can be carried out at the same time. As a result, while the recording precision can be improved, the recording medium can be utilized in the maximum efficiency, as compared with the conventional technique for alternately performing the recording operation and the control operation.

In the recording/reproducing apparatus of this embodiment 1, not only the hologram recording/reproducing operation can be realized, but also such a recording/reproducing operation by the bit-by-bit system can be realized. Next, a description is made of operations when the recording/reproducing apparatus of the present invention with respect to the above-described arrangement performs a DVD recording/reproducing operation and a CD recording/reproducing operation.

Figure 10:
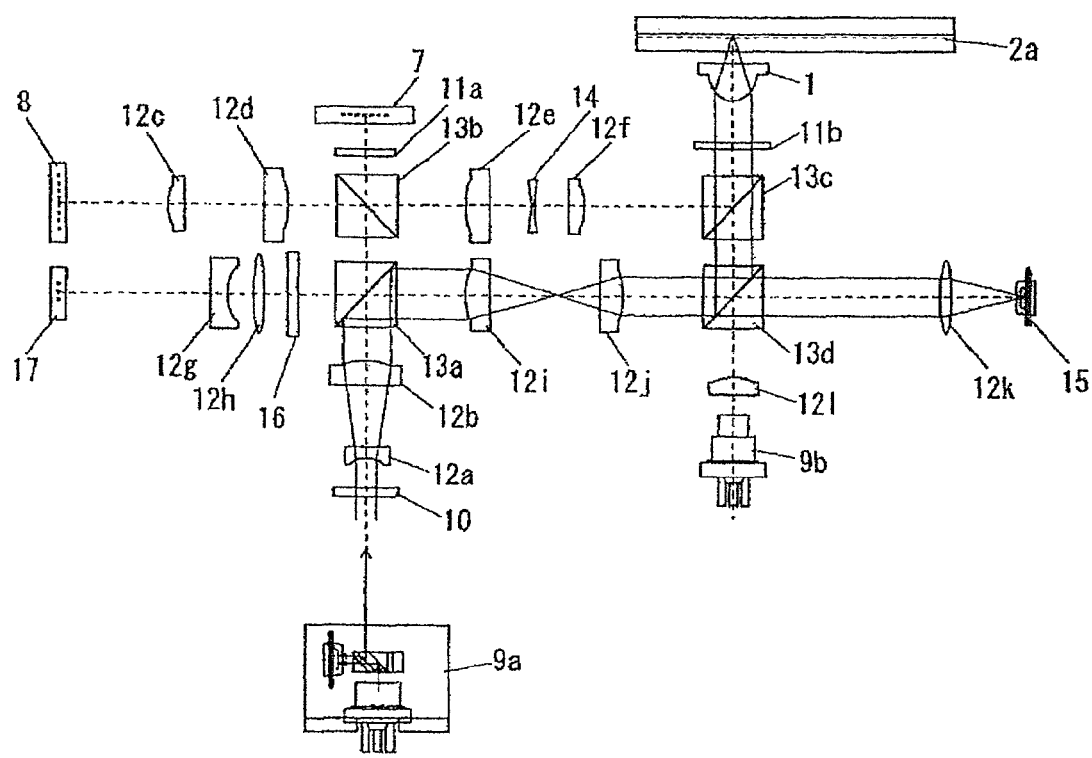
FIG. 10 is a diagram for showing an optical system and optical axes of a going path in such a case that when a DVD recording operation is carried out by using the optical system employed in the hologram recording/reproducing operation, DVD light passes through an optical path of reference light during the hologram recording/reproducing operation so as to perform the DVD recording/reproducing operation.
Figure 11:
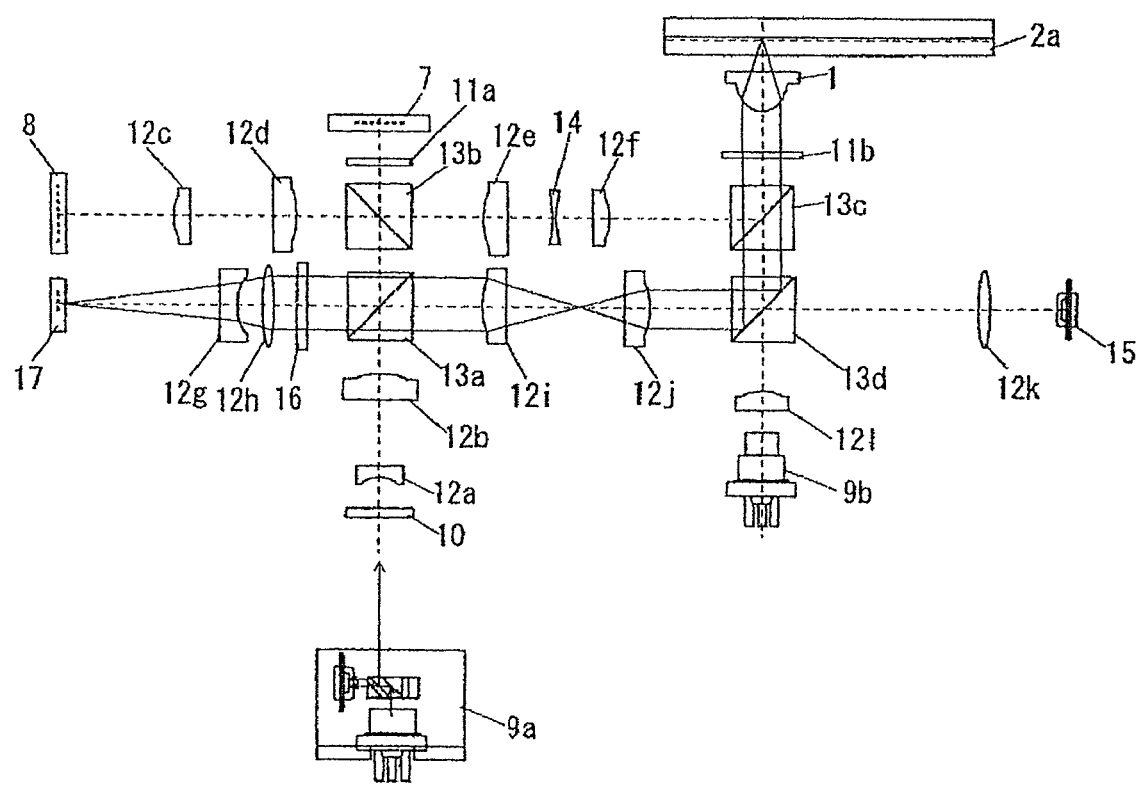
FIG. 11 is a diagram for showing an optical system and optical axes of a returning path in such a case that when a DVD recording operation is carried out by using the optical system employed in the hologram recording/reproducing operation, DVD light passes through an optical path of reference light during the hologram recording/reproducing operation so as to perform the DVD recording/reproducing operation.

Firstly, a description is made of operations when a DVD is recorded and reproduced with reference to FIG. 10 and FIG. 11. FIG. 10 is a diagram for representing an optical system and optical axes of a going path in such a case that when the optical system employed in the hologram recording/reproducing operation is used so as to perform a DVD recording operation, DVD light passes through the optical path for the reference light during the hologram recording/reproducing operation so as to perform the DVD recording/reproducing operation. FIG. 11 is a diagram for showing an optical system and optical axes of a returning path in such a case that when the optical system employed in the hologram recording/reproducing operation is used so as to perform a DVD recording/reproducing operation, DVD light passes through the optical path of the reference light during the hologram recording/reproducing operation so as to perform the DVD recording/reproducing operation.

FIG. 10 shows such operation situations that laser light emitted from the laser light source 9a when the DVD recording/reproducing operation is carried out reaches the recording medium 2a, and records/reads information with respect to the recording medium 2a. The laser light emitted from the laser light source 9a is entered to the L.C.HWP 10 under OFF status. Since the L.C.HWP 10 is under the OFF status, the polarized light of the laser light is not changed, namely remains as S-polarized light, this S-polarized light is reflected on the PBS 13a, and then, the reflected S-polarized light is entered to the PBS 13d. The PBS 13d is designed in such a manner that this PBS 13d passes therethrough a partial light portion of the S-polarized light of the DVD-purpose laser light and reflects there on the remaining light portion of this polarized light. The laser light which has passed through the PBS 13d is entered to the front light monitor 15 so as to read a light amount of this entered laser light, and then, the read light amount is employed so as to control a light amount of laser light emitted from the light source 9a. The laser light reflected from the PBS 13d passes through the PBS 13c, and thereafter, this reflected laser light is converted to circularly polarized light by the QWP 11b. Thereafter, while the circularly polarized light is collected by the objective lens 1, the collected circularly polarized light is entered to the recording medium 2a so as to record/read the information with respect to this recording medium 2a.

FIG. 11 shows such a situation that when a DVD recording/reproducing operation is carried out, laser light reflected on the reflection plane of the recording medium 2a reaches the PDIC 17, and then, signals are detected by the laser light. That is, the laser light reflected on the reflection plane of the recording medium 2a passes through the objective lens 1, and thereafter, is processed by the QWP 11b so as to be converted from the circularly polarized light to P-polarized light; the P-polarized light having a predetermined light amount passes through the PBS 13c, and is reflected by the PBS 13d, and then, the reflected P-polarized light is penetrated through the lenses 12i and 12j so as to form the P-polarized light having a proper beam diameter; and thereafter, the P-polarized light having the proper beam diameter passes through the PBS 13a, and then, is collected to the PDIC 17 via the transmission type diffraction optical element 16 and the lenses 12h and 12g. An address/servo control operation and a signal detection for recorded information are carried out based upon the laser light read by the PIDC 17.

In other words, when the DVD recording/reproducing operation is performed, the substantially entire optical path defined by that after the DVD-purpose laser light is emitted, the emitted laser light is reflected on the recording medium 2a, and then, the reflected laser light reaches the PDIC 17 is identical to the optical path of the reference light when the hologram recording/reproducing operation is carried out.

As previously described, the DVD-purpose light source is employed when the hologram recording operation is carried out, whereas the optical path for the reference light used when the hologram recording/reproducing operation is carried out is employed in such a case that the DVD recording/reproducing operation is carried out. As a consequence, while the light source is defined as a starting point, the optical paths used in the recording operations are commonly utilized in the DVD recording operation and the hologram recording operation, so that such a recording/reproducing apparatus can be readily realized. That is, the recording/reproducing apparatus has compatibility capable of commonly utilizing the optical systems in a high efficiency, while there are many optical systems which can be commonly utilized in the hologram recording operation and the DVD recording operation. As a result, even in a recording/reproducing apparatus capable of realizing both a hologram recording operation and a DVD recording operation by employing optical paths for two systems (namely, information light and reference light), the entire recording/reproducing apparatus can be largely made compact, as compared with such a case that both the hologram recording operation and the DVD recording operation are realized by employing separate optical systems.

Also, in case of the DVD recording/reproducing operation, the optical path of the reference light is employed as the optical path which is commonly utilized when the hologram recording/reproducing operation is carried out. As a result, since the laser light does not pass through such an optical member which is not required in the DVD recording operation, it is possible to eliminate loss and noise of the laser light, which are produced when the DVD recording operation is performed via the optical spatial modulating unit.

Figure 12:
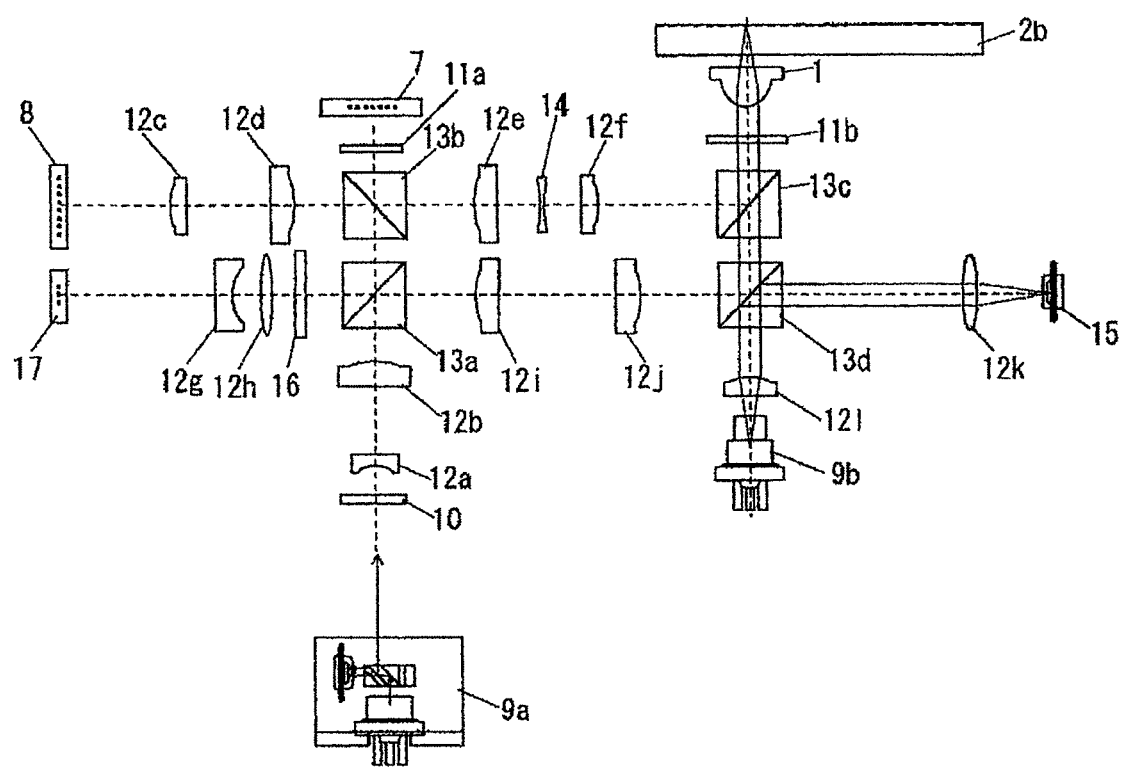
FIG. 12 is a diagram for showing an optical system and optical axes of a going path in such a case that a CD recording/reproducing operation is carried out by employing the optical system used in the address/servo control operation during the hologram recording/reproducing operation.
Figure 13:
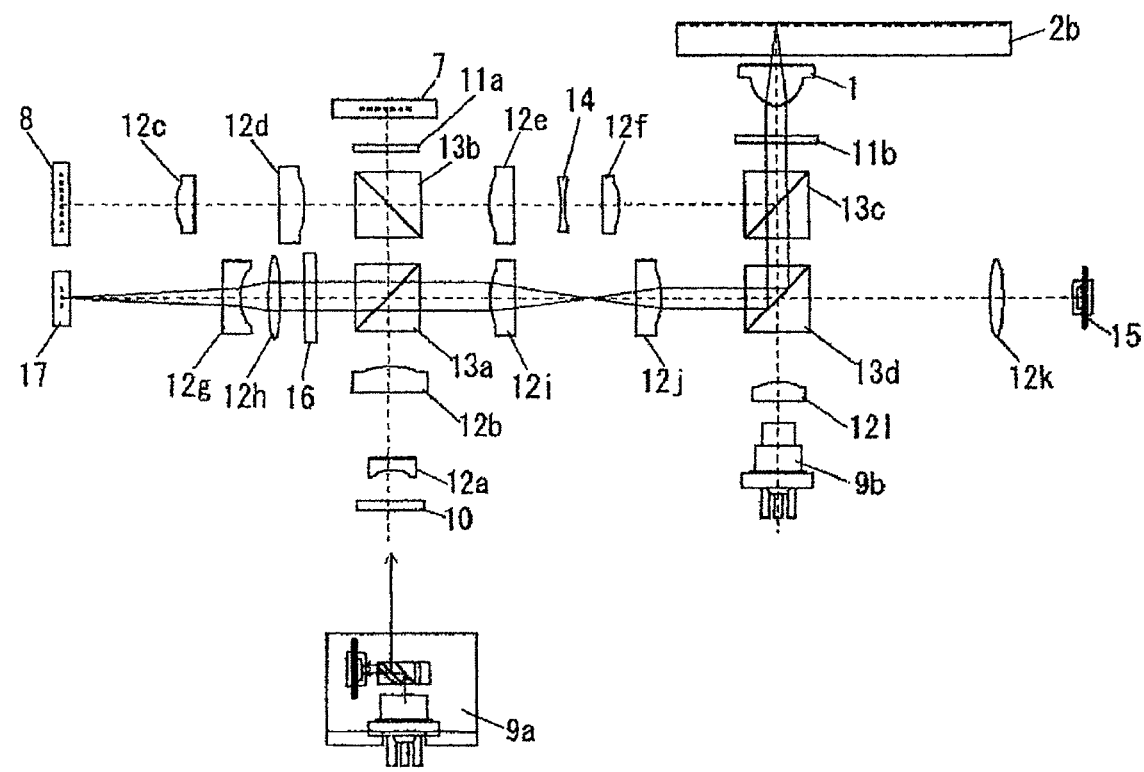
FIG. 13 is a diagram for showing an optical system and optical axes of a returning path in such a case that a CD recording/reproducing operation is carried out by employing the optical system used in the address/servo control operation during the hologram recording/reproducing operation.

Next, a description is made of operations when a CD is recorded and reproduced with reference to FIG. 12 and FIG. 13. FIG. 12 is a diagram for representing an optical system and optical axes of a going path in such a case that when the optical system employed in the address/servo control operation during the hologram recording/reproducing operation is used so as to perform a CD recording/reproducing operation. FIG. 13 is a diagram showing an optical system and optical axes of a returning path in such a case that when the optical system employed in the address/servo control operation during the hologram recording/reproducing operation is used so as to perform the CD recording/reproducing operation.

Firstly, FIG. 12 shows such operation situations that laser light emitted from the laser light source 9b when the CD recording/reproducing operation is carried out reaches the recording medium 2b, and records/reads information with respect to the recording medium 2b.

A partial light portion of the laser light emitted from the light source 9b is reflected by the PBS 13d, and the remaining light portion thereof passes through the PBS 13d. The laser light reflected by the PB 13d is collected to the front light monitor 15 by the lens 12k so as to read a light amount of this collected laser light. The read light amount is employed so as to control a light amount of the laser emitted from the light source 9b. The laser light which has passed through the PBS 13d passes through the PBS 13c, and thereafter, this laser light is converted to circularly polarized light by the QWP 11b. Thereafter, while the circularly polarized light is collected by the objective lens 1, the collected circularly polarized light is entered to the recording medium 2b so as to record/read the information with respect to this recording medium 2b.

FIG. 13 shows such a situation that when a CD recording/reproducing operation is carried out, laser light reflected on the reflection plane of the recording medium 2b reaches the PDIC 17, and then, signals are detected by the laser light. That is, the laser light reflected on the reflection plane of the recording medium 2b passes through the objective lens 1, and thereafter, is processed by the QWP 11b so as to be converted from the circularly polarized light to P-polarized light; the P-polarized light passes through the PBS 13c, and is reflected by the PBS 13d, and then, the reflected P-polarized light is penetrated through the lenses 12i and 12j so as to form the P-polarized light having a proper beam diameter; and thereafter, the P-polarized light having the proper beam diameter passes through the PBS 13a, and then, is collected to the PDIC 17 via the transmission type diffraction optical element 16 and the lenses 12h and 12g. Various sorts of servo control operations and a signal detection for recorded information are carried out based upon the laser light read by the PIDC 17.

As previously described, when the hologram recording operation is carried out, the CD-purpose light source is employed as the laser light source for performing various sorts of servo control operations. On the other hand, when the CD recording/reproducing operation is carried out, the second optical path is employed which is established not via the optical spatial modulating unit employed in the hologram recording operation. As a consequence, while the light source is defined as a starting point, the optical paths used in the recording operations are commonly utilized in the CD recording operation and the hologram recording operation, so that such a recording/reproducing apparatus can be readily realized. That is, the recording/reproducing apparatus has compatibility capable of commonly utilizing the optical system, while there are many optical systems which can be commonly utilized in the hologram recording operation and the CD recording operation. As a result, even in a recording/reproducing apparatus capable of realizing both a hologram recording operation and a CD recording operation by employing optical paths for two systems (namely, information light and reference light), the entire recording/reproducing apparatus can be largely made compact, as compared with such a case that both the hologram recording operation and the CD recording operation are realized by employing separate optical systems.

Embodiment 2

An embodiment 2 of the present invention is featured by that a DVD is recorded and reproduced by employing an optical path for information light when a hologram recording operation is carried out. It should be understood that for the sake of convenience, the same reference numerals shown in the embodiment 1 will be employed as those for denoting the same structural components, and concrete descriptions thereof will be similarly conducted in the below-mentioned embodiment 2.

Figure 14:
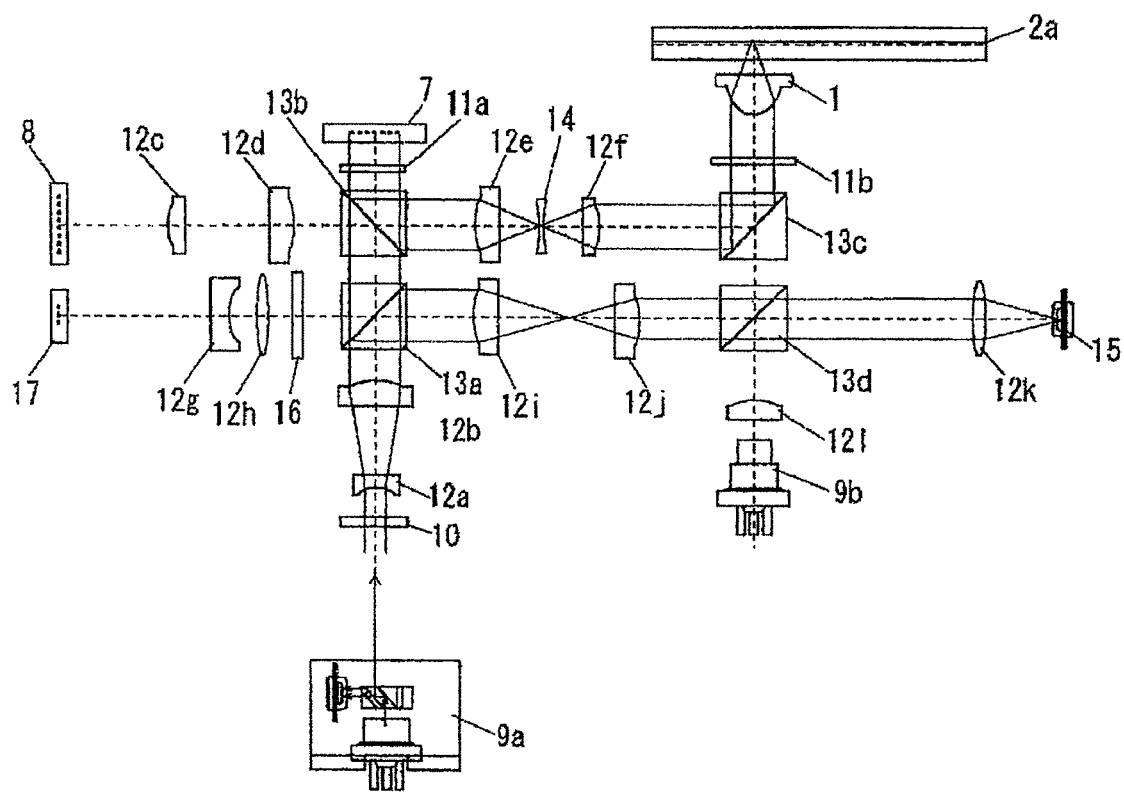
FIG. 14 is a diagram for showing an optical system and optical axes of a going path in such a case that when a DVD recording operation is carried out by using the optical system employed in the hologram recording/reproducing operation, DVD light passes through an optical path of information light during the hologram recording/reproducing operation so as to perform the DVD recording/reproducing operation.
Figure 15:
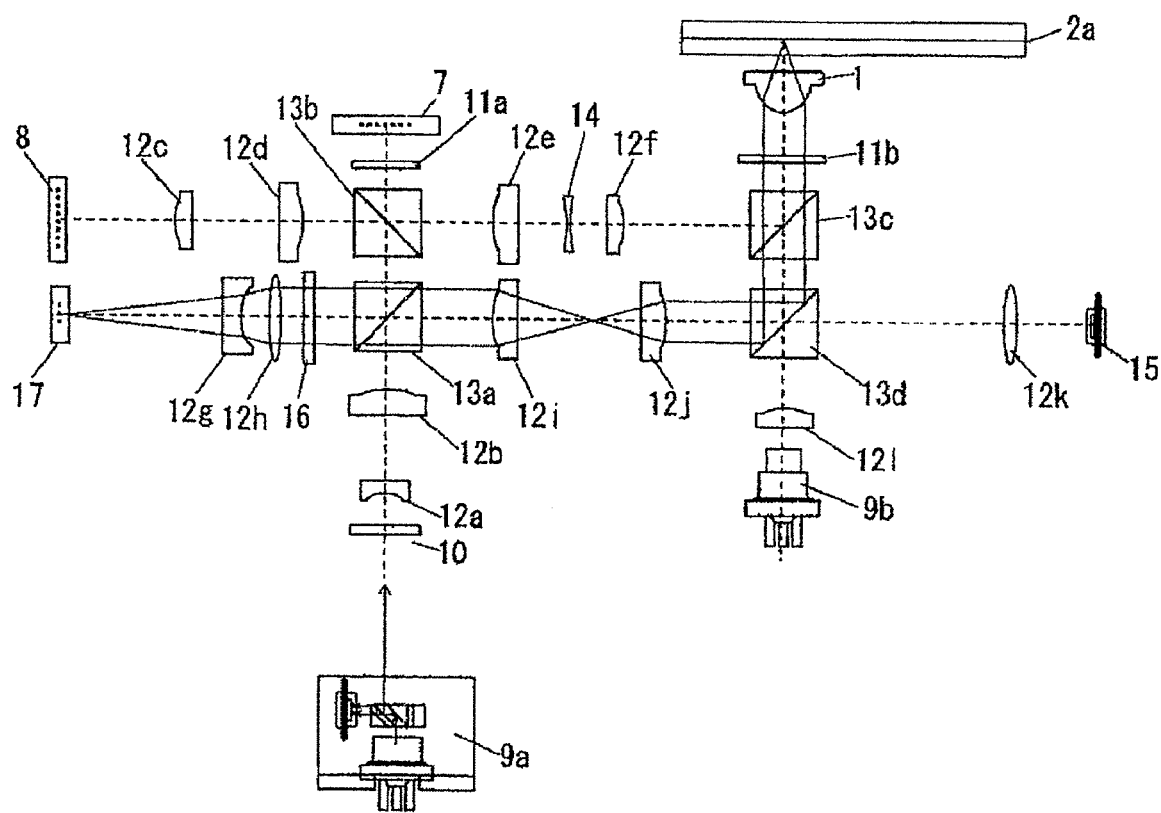
FIG. 15 is a diagram for showing an optical system and optical axes of a returning path in such a case that when a DVD recording operation is carried out by using the optical system employed in the hologram recording/reproducing operation, DVD light passes through an optical path of information light during the hologram recording/reproducing operation so as to perform the DVD recording/reproducing operation.

Firstly, a description is made of operations when a DVD is recorded and reproduced in the embodiment 2 with reference to FIG. 14 and FIG. 15. FIG. 14 is a diagram for representing an optical system and optical axes of a going path in such a case that when the optical system employed in the hologram recording/reproducing operation is used so as to perform a DVD recording operation, DVD light passes through the optical path for the information light during the hologram recording/reproducing operation so as to perform the DVD recording/reproducing operation. FIG. 15 is a diagram for showing an optical system and optical axes of a returning path in such a case that when the optical system employed in the hologram recording/reproducing operation is used so as to perform the DVD recording/reproducing operation, DVD light passes through the optical path of the information light during the hologram recording/reproducing operation so as to perform the DVD recording/reproducing operation.

FIG. 14 shows such operation situations that laser light emitted from the laser light source 9a when the DVD recording/reproducing operation is carried out reaches the recording medium 2a, and records/reads information with respect to the recording medium 2a. The laser light emitted from the laser light source 9a is entered to the L.C.HWP 10 under ON status. The laser light which is held only the S-polarized light when this laser light was emitted from the laser light source 9a will also have P-polarized light by the L.C.HWP 10. As a result, the S-polarized light is reflected on the PBS 13a, and the P-polarized light passes through the PBS 13a, which are branched to two optical paths. The laser light having the S-polarized light reflected on the PBS 13a is penetrated through the lenses 12i and 12j so as to become a proper beam diameter, and thereafter, the processed S-polarized light is entered to the PBS 13d, so that a partial light portion of this entered laser light passes through the PBS 13d. The laser light which has passed through the PBS 13d is entered to the front light monitor 15 by the lens 12k so as to read a light amount of this entered laser light, and then, the read light amount is employed so as to control a light amount of laser light emitted from the light source 9a. The laser light of the P-polarized light which has passed through the PBS 13a also passes through the PBS 13b, and this P-polarized light is converted into circularly polarized light by the QWP 11a, and thereafter, the circularly polarized light reaches the SLM 7.

In this case, the SLM 7 is not especially required to apply two-dimensional data to the laser light, but the SLM 7 is required to merely reflect the reached laser light. The laser light reflected by the SLM 7 again passes through the QWP 11a, so that the circularly polarized light is converted to S-polarized light; the polarized light is reflected by the PBS 13b, and then, the reflected S-polarized light is processed by the lenses 12e and 12f so as to become a proper beam diameter; and thereafter, the S-polarized light having a predetermined light amount is reflected by the PBS 13c. The laser light reflected by the PBS 13c is converted into circularly polarized light by the QWP 11b, and thereafter, the circularly polarized light is collected to the recording medium 2a by the objective lens 1 so as to record/read information with respect to the recording medium 2a.

FIG. 15 shows such a situation that when a DVD recording/reproducing operation is carried out, laser light reflected on the reflection plane of the recording medium 2a reaches the PDIC 17, and then, signals are detected by the laser light. That is, the laser light reflected on the reflection plane of the recording medium 2a passes through the objective lens 1, and thereafter, is processed by the QWP 11b so as to be converted from the circularly polarized light to P-polarized light; the P-polarized light having a predetermined ratio of light amounts passes through the PBS 13c, and is reflected by the PBS 13d, and then, the reflected P-polarized light is penetrated through the lenses 12i and 12j so as to form the P-polarized light having a proper beam diameter; and thereafter, the P-polarized light having the proper beam diameter passes through the PBS 13a, and then, is collected to the PDIC 17 via the transmission type diffraction optical element 16 and the lenses 12h and 12g. Various sorts of servo control operations and a signal detection for recorded information are carried out based upon the laser light read by the PIDC 17.

As previously described, the DVD-purpose light source is employed when the hologram recording operation is carried out, whereas in such a case that the DVD recording/reproducing operation is carried out, a first optical path routed via the optical spatial modulating unit 7 to be employed in the hologram recording operation is employed in the major optical path defined from the light source 9a to the recording medium 2a, and also, a second optical path routed not via the optical spatial modulating unit 7 to be employed in the hologram recording operation is employed in the major optical path through which the light reflected from the recording medium 2a reaches the PDIC 17. As a consequence, while the light source is defined as a starting point, the optical paths used in the recording operations are commonly utilized in the DVD recording operation and the hologram recording operation, so that such a recording/reproducing apparatus can be readily realized. That is, the recording/reproducing apparatus has compatibility capable of commonly utilizing the optical systems in a high efficiency, while there are many optical systems which can be commonly utilized in the hologram recording operation and the DVD recording operation. As a result, even in a recording/reproducing apparatus capable of realizing both a hologram recording operation and a DVD recording operation by employing optical paths for two systems (namely, information light and reference light), the entire recording/reproducing apparatus can be largely made compact, as compared with such a case that both the hologram recording operation and the DVD recording operation are realized by employing separate optical systems.

Figure 16:
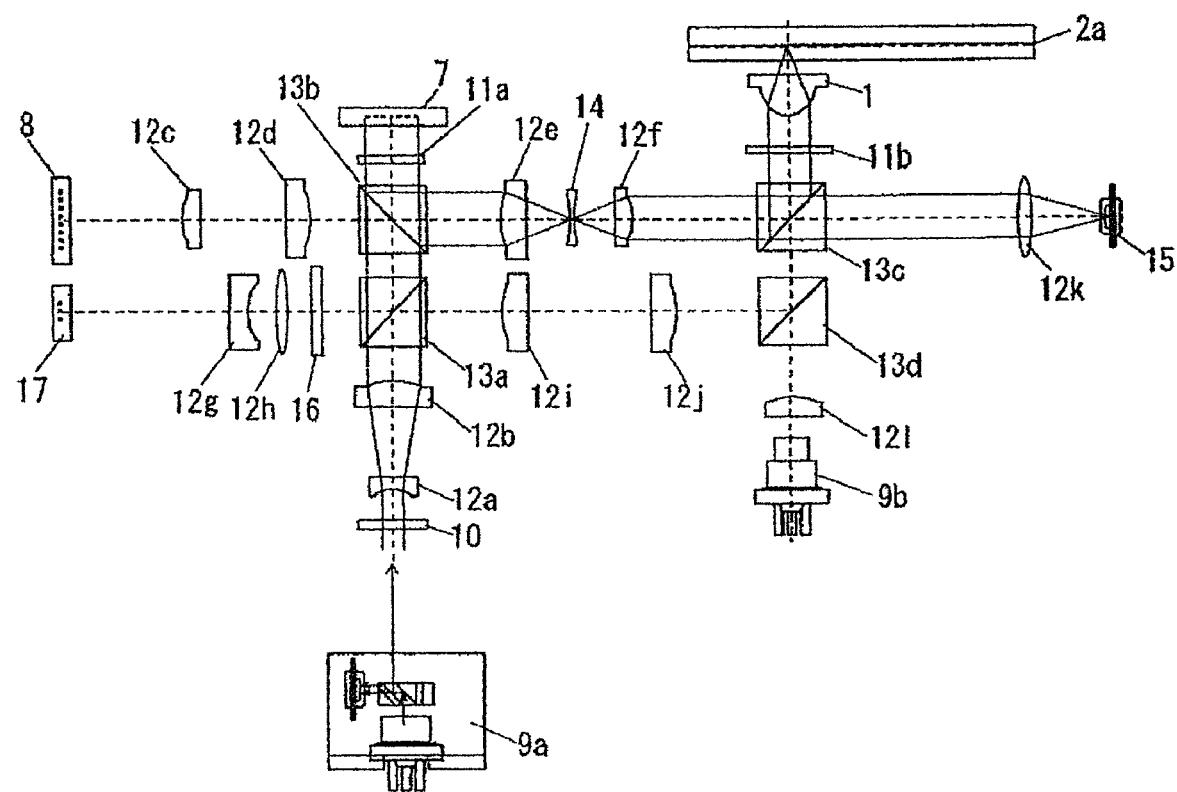
FIG. 16 is a diagram for showing optical axes in such a case that when a DVD recording operation is carried out by using the optical system employed in the hologram recording/reproducing operation, such an optical system is changed when DVD light passes through an optical path of information light during the hologram recording/reproducing operation so as to perform the DVD recording/reproducing operation.

For example, the front light monitor 15 provided in order to control the light amount of the laser light emitted from the light source, 9a may be alternatively installed at such a position, as shown in FIG. 16, located in front of a place where a partial light portion of the laser light reflected by the SLM 7 has passed through the PBS 13c.

In this alternative case, it is no longer required to branch the laser light along the two directions by the PBS 13a. Thus, the laser light emitted from the light source 9a is converted to P-polarized light by the L.C.HWP 10, the P-polarized light passes through the PBS 13a, and then, passes through the optical path for the information light when the hologram recording operation is carried out.

As a consequence, the laser light emitted from the light source 9a when the DVD recording/reproducing operation is carried out passes through only the optical path of the information light when the hologram recording operation is performed, so that the laser light emitted from the light source 9a can be employed in a higher efficiency.

It should be understood that when the front light monitor 15 is located at such a position as shown in FIG. 16, in order to sense a light amount of CD-purpose laser light, the PBS 13d and the PBS 13c must have such an optical characteristic with respect to the CD-purpose laser light. That is, the PBS 13d must pass the S-polarized light and must reflect the P-polarized light; and the PBS 13c must reflect the S-polarized light having a predetermined ratio of light amounts and must pass the remaining amount of this S-polarized light, and further, must pass the P-polarized light.

Embodiment 3

An embodiment 3 of the present invention is featured by that while an optical system for performing a BD recording/reproducing operation is additionally provided with the above-described arrangement, the optical path for the reference light during the hologram recording/reproducing operation is utilized when a BD and a DVD are recorded and reproduced. A description is made of situations when the hologram recording/reproducing operation is carried out, the DVD recording/reproducing operation is carried out, the CD recording/reproducing operation is carried out, and the BD recording/reproducing operation is carried out by the optical disk recording/reproducing apparatus, according to the embodiment 3 of the present invention, which is equipped with compatibility with the bit-by-bit recording operation and performs the hologram recording/reproducing operation. It should be understood that for the sake of convenience, the same reference numerals shown in the embodiment 1 will be employed as those for denoting the same structural components, and concrete descriptions thereof will be similarly conducted in the below-mentioned embodiment 3.

Figure 17:
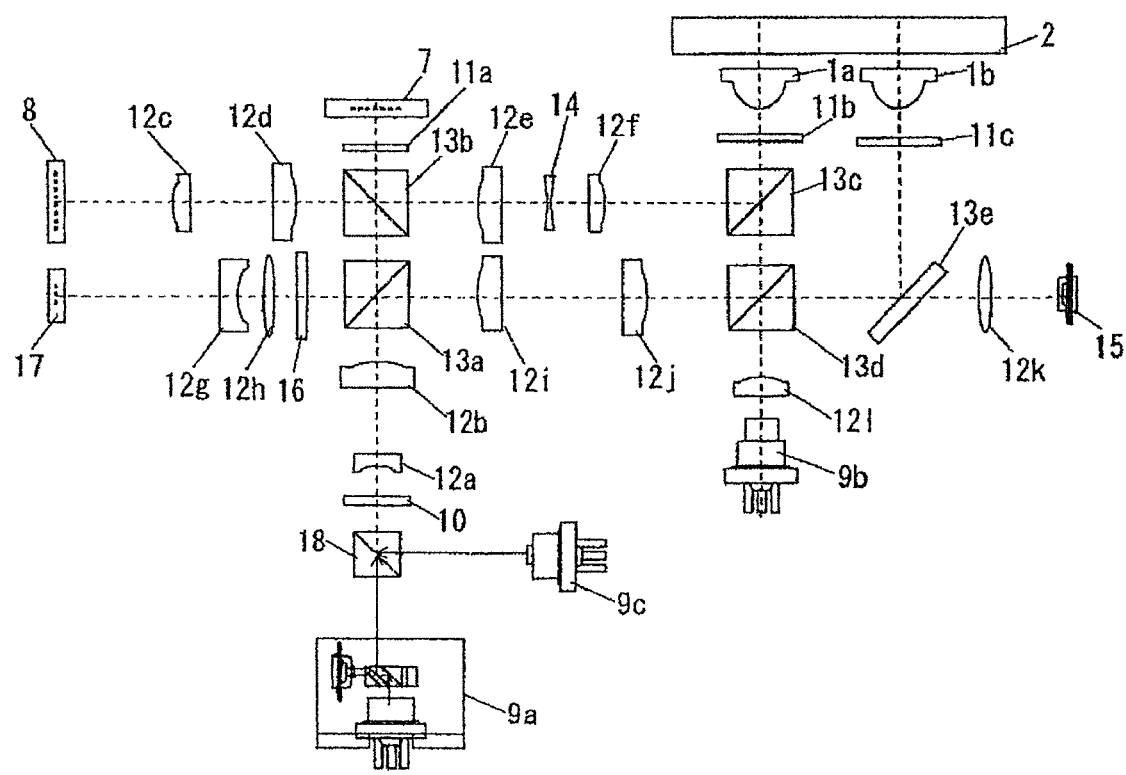
FIG. 17 is a diagram for showing an optical system arrangement of a hologram recording/reproducing apparatus having compatibility with bit-by-bit recording/reproducing operation such as a CD, a DVD, and a BD.

Firstly, FIG. 17 shows an example as to an optical system layout of an optical disk drive capable of performing the hologram recording/reproducing operation, the DVD recording/reproducing operation, and the CD recording/reproducing operation. The optical system is arranged by an objective lens 1a (equivalent to objective lens 1 of embodiments 1 and 2), another objective lens 1b, a recording medium 2; an optical-spatial modulating unit (will be referred to as "SLM" hereinafter) 7; an imaging element (CCD camera, or CMOS camera) 8, a DVD-purpose laser light source 9a; a CD-purpose laser light source 9b; a BD-purpose laser light 9c; a liquid crystal half wavelength plate (will be referred to as "L.C.HWP" hereinafter) 10; a quarter wavelength plate (will be referred to as "QWP" hereinafter) 11; a beam expander 12; a polarization beam splitter (will be referred to as "PBS" hereinafter) 13, a pin hole 14; a front light monitor 15 for sensing a light amount of laser light; a transmission type diffraction optical element 16; a photodetector IC (PDIC) 17 for detecting a plurality of laser light; a beam splitter (BS) 18, and the like.

In this case, optical characteristic of the above-described optical elements BS 18 and PBSs 13a to 13e will now be described: That is, the BS 18 passes therethrough DVD light 5a, and reflects therefrom BD light 5c. The PBSs 13a and 13b pass therethrough P-polarized light of laser light having respective wavelengths, and reflect therefrom S-polarized light thereof. The PBS 13c passes therethrough P-polarized light with respect to the DVD light 5a, passes therethrough S-polarized light by 50% and reflects therefrom the S-polarized light by 50%, whereas the PBS 13c passes therethrough any of the P-polarized and S-polarized light with respect to the CD light 5b. The PBS 13d reflects therefrom the P-polarized light, passes therethrough the S-polarized light by 10% and reflects therefrom the S-polarized light by 90% with respect to the DVD light 5a; the PBS 13d reflects therefrom the P-polarized light, reflects therefrom the S-polarized light by 10% and passes therethrough the S-polarized light. By 90% with respect to the CD light 5b, and whereas the PBS 13d passes therethrough any of the P-polarized and the S-polarized light with respect to the BD light 5c. The PBS 13e passes therethrough both the DVD light 5a and the CD light 5b; and the PBS 13e reflects therefrom the P-polarized light, passes therethrough the S-polarized light by 10%, and reflects therefrom the S-polarized light by 90% with respect to the BD light 5c. Although the optical characteristics as to the BS 18 and the respective PBS 13a to 13e are determined by the above-described assumptions in this embodiment 3, the ratios of the transmissions and reflections may be arbitrarily determined. These transmission/reflection ratios may be properly determined based upon an optical system to be constructed, and therefore, are not limited only to the above-described values.

A description is made of situations when a hologram recording/reproducing operation is performed; a DVD recording/reproducing operation is performed; a CD recording/reproducing operation is performed; and a BD recording/reproducing operation is performed.

First of all, when the hologram recording/reproducing operation is carried out, in addition to the structure of the embodiment 1, only the BS 18 and the PBS 13e are merely provided on an optical path along which laser light emitted from a laser light source is traveled. Since both the BS 18 and the PBS 13e have the property capable of passing therethrough the DVD light 5a employed in this hologram recording/reproducing operation, this situation is equivalent to such a fact that these optical elements are not present, as viewed from the DVD light 5a. As a consequence, the optical elements are merely increased which pass the light when the hologram recording/reproducing operation is carried out, so that situations when this hologram recording/reproducing operation is performed are substantially identical to the situations during the hologram recording/reproducing operation described in the embodiment 1.

Next, when the DVD recording/reproducing operation is carried out, in addition to the structure of the embodiment 1, only the BS 18 and the PBS 13e are merely provided on an optical path along which laser light emitted from a laser light source is traveled. Since both the BS 18 and the PBS 13e have the property capable of passing therethrough the DVD light 5a employed in this DVD recording/reproducing operation, this situation is equivalent to such a fact that these optical elements are not present, as viewed from the DVD light 5a. As a consequence, the optical elements are merely increased which pass the light when the DVD recording/reproducing operation is carried out, so that situations when this DVD recording/reproducing operation is performed are substantially identical to the situations during the DVD recording/reproducing operation described in the embodiment 1.

Next, when the CD recording/reproducing operation is carried out, in addition to the structure of the embodiment 1, only the PBS 13e is merely provided on an optical path along which laser light emitted from a laser light source is traveled. Since the PBS 13e has the property capable of passing therethrough the CD light 5b employed in this CD recording/reproducing operation, this situation is equivalent to such a fact that this optical element is not present, as viewed from the CD light 5b. As a consequence, the optical element is merely increased which passes the light when the CD recording/reproducing operation is carried out, so that situations when this CD recording/reproducing operation is performed are substantially identical to the situations during the CD recording/reproducing operation described in the embodiment 1.

Figure 18:
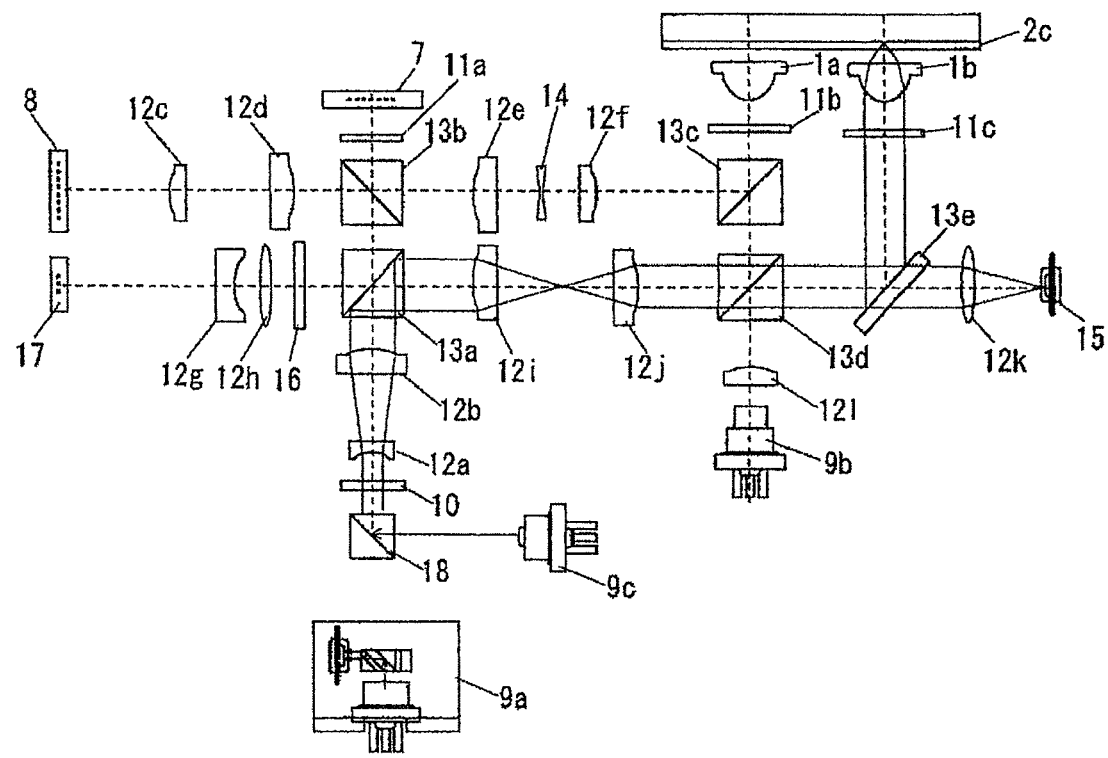
FIG. 18 is a diagram for indicating an optical system and optical axes of a going path in such a case that when a BD recording/reproducing operation is performed in the hologram recording/reproducing operation having the compatibility with the bit-by-bit recording operation, BD light passes through the optical path of the reference light during the hologram recording operation so as to perform the BD recording/reproducing operation.
Figure 19:
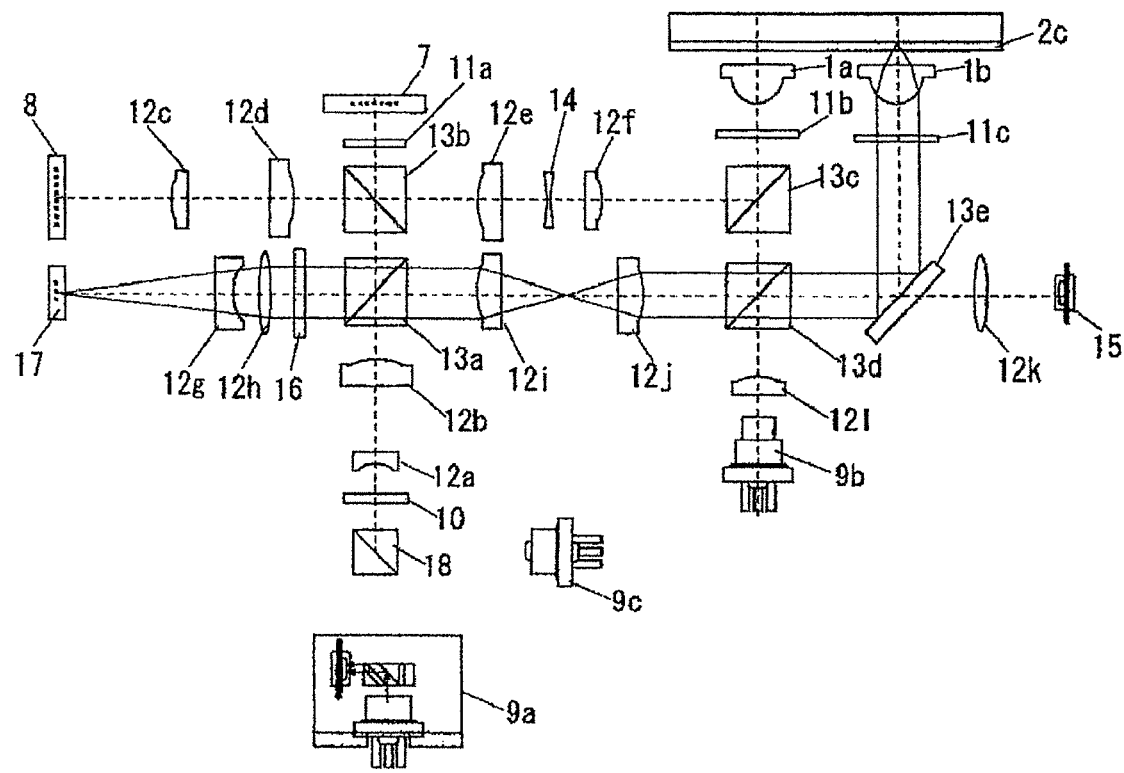
FIG. 19 is a diagram for indicating an optical system and optical axes of a returning path in such a case that when a BD recording/reproducing operation is performed in the hologram recording/reproducing operation having the compatibility with the bit-by-bit recording operation, BD light passes through the optical path of the reference light during the hologram recording operation so as to perform the BD recording/reproducing operation.

Next, a description is made of situations when the BD recording/reproducing operation is carried out with reference to FIG. 18 and FIG. 19. FIG. 18 is a diagram for indicating an optical system and optical axes of a going path in such a case that BD light passes through the optical path of the reference light during the hologram recording operation so as to perform a BD recording/reproducing operation when the BD recording/reproducing operation is performed in the hologram recording/reproducing apparatus having the compatibility with respect to the bit-by-bit recording operation. FIG. 19 is a diagram for indicating an optical system and optical axes of a returning path in such a case that BD light passes through the optical path of the reference light during the hologram recording operation so as to perform the BD recording/reproducing operation when the BD recording/reproducing operation is performed in the hologram recording/reproducing apparatus having the compatibility with respect to the bit-by-bit recording operation.

In FIG. 18, the laser light emitted from the laser light source 9c is entered to the L.C.HWP 10 under OFF status. Since the L.C.HWP 10 is under the OFF status, the polarized light of the laser light is not changed, namely remains as S-polarized light, this S-polarized light is reflected on the PBS 13a, and then, the reflected S-polarized light is entered to the PBS 13d after the present beam diameter is converted to a proper beam diameter by the lenses 12i and 12j. The PBS 13d is designed in such a manner that this PBS 13d passes therethrough BD-purpose laser light 5c and the BD-purpose laser light 5c which has passed through the PBS 13d is entered to the PBS 13e. The PBS 13e has such a property that this PBS 13e passes therethrough a partial light portion of the S-polarized light of the DVD-purpose laser light 5a and reflects thereon the remaining light portion of this S-polarized light. The laser light which has passed through the PBS 13e is entered to the front light monitor 15 so as to read a light amount of this entered laser light, and then, the read light amount is employed so as to control a light amount of laser light emitted from the light source 9c. The laser light reflected from the PBS 13e is converted to circularly polarized light by the QWP 11c. Thereafter, while the circularly polarized light is collected by the objective lens 1b, the collected circularly polarized light is entered to the recording medium 2c so as to record/read the information with respect to this recording medium 2c.

In FIG. 19, laser light reflected on the reflection plane of the recording medium 2c passes through the objective lens 1b, and thereafter, the passed laser light is converted by the QWP 11c from the circularly polarized light to P-polarized light; the P-polarized light is reflected by the PBS 13e, the reflected P-polarized light is penetrated through the lenses 12i and 12j so as to form the P-polarized light having a proper beam diameter; and thereafter, the P-polarized light having the proper beam diameter passes through the PBS 13a, and then, is collected to the PDIC 17 via the transmission type diffraction optical element 16 and the lenses 12h and 12g. Various sorts of servo control operations and a signal detection for recorded information are carried out based upon the laser light read by the PIDC 17.

At this time, the embodiment 3 has such a feature that a major portion of the optical paths defined by that after the BD-purpose laser light is emitted, the BD-purpose laser light is reflected on the recording media 2c, and then, the reflected laser light reaches the PDIC 17 is identical to the optical path for the reference light when the hologram recording/reproducing operation is performed.

As previously described, the DVD-purpose light source is employed when the hologram recording operation is carried out, whereas a second optical path is used when the BD recording/reproducing operation is carried out, while the second optical path is not routed via the optical spatial modulating unit employed in the hologram recording operation. As a consequence, while the light source is defined as a starting point, the optical paths used in the recording operations are commonly utilized in the BD recording operation and the hologram recording operation, so that such a recording/reproducing apparatus can be readily realized. That is, the recording/reproducing apparatus has compatibility capable of commonly utilizing the optical systems in a high efficiency, while there are many optical systems which can be commonly utilized in the hologram recording operation and the BD recording operation. As a result, even in a recording/reproducing apparatus capable of realizing both a hologram recording operation and a BD recording operation by employing optical paths for two systems (namely, information light and reference light), the entire recording/reproducing apparatus can be largely made compact, as compared with such a case that both the hologram recording operation and the BD recording operation are realized by employing separate optical systems.

Also, in case of the BD recording/reproducing operation, the second optical path which does not route the optical spatial modulating unit is employed as the optical path which is commonly utilized when the hologram recording/reproducing operation is carried out. As a result, since the laser light does not pass through such an optical member which is not required in the BD recording operation, it is possible to eliminate loss and noise of the laser light, which are produced when the BD recording operation is performed via the optical spatial modulating unit.

Embodiment 4

An embodiment 4 of the present invention is featured by that while an optical system for performing a BD recording/reproducing operation is additionally provided with the above-described arrangement of the embodiment 2, the optical path for the information light during the hologram recording/reproducing operation is utilized when a BD and a DVD are recorded and reproduced. A description is made of situations when the hologram recording/reproducing operation is carried out, the DVD recording/reproducing operation is carried out, the CD recording/reproducing operation is carried out, and the BD recording/reproducing operation is carried out by the optical disk recording/reproducing apparatus, according to the embodiment 3 of the present invention, which is equipped with compatibility with the bit-by-bit recording operation and performs the hologram recording/reproducing operation. It should be understood that for the sake of convenience, the same reference numerals shown in the embodiment 3 will be employed as those for denoting the same structural components, and concrete descriptions thereof will be similarly conducted in the below-mentioned embodiment 4.

In this embodiment 4, in addition to the structure of the embodiment 3, a PBS 13f is arranged between the PBS 13e and the QWP 11c. In this case, the PBS 13c has such an optical characteristic that this PBS 13c passes therethrough the BD light 5c in addition to the optical characteristic described in the embodiment 3; and the above-described PBS 13f has such an optical characteristic that this PBS 13f reflects therefrom S-polarized light and passes therethrough P-polarized light with respect to the BD light 5c. Although the optical characteristics as to the respective PBS 13c and 13f are determined by the above-described assumptions in this embodiment 4, the ratios of the transmissions and reflections may be arbitrarily determined. These transmission/reflection ratios may be properly determined based upon an optical system to be constructed, and therefore, are not limited only to the above-described values.

First of all, when the hologram recording/reproducing operation is carried out, in addition to the structure of the embodiment 2, only the BS 18 and the PBS 13e are merely provided on an optical path along which laser light emitted from a laser light source is traveled. Since both the BS 18 and the PBS 13e have the property capable of passing therethrough the DVD light 5a employed in this hologram recording/reproducing operation, this situation is equivalent to such a fact that these optical elements are not present, as viewed from the DVD light 5a. As a consequence, the optical elements are merely increased which pass the light when the hologram recording/reproducing operation is carried out, so that situations when this hologram recording/reproducing operation is performed are substantially identical to the situations during the hologram recording/reproducing operation described in the embodiment 1.

Next, when the DVD recording/reproducing operation is carried out, in addition to the structure of the embodiment 2, only the BS 18 and the PBS 13e are merely provided on an optical path along which laser light emitted from a laser light source is traveled. Since both the BS 18 and the PBS 13e have the property capable of passing therethrough the DVD light 5a employed in this DVD recording/reproducing operation, this situation is equivalent to such a fact that these optical elements are not present, as viewed from the DVD light 5a. As a consequence, the optical elements are merely increased which pass the light when the DVD recording/reproducing operation is carried out, so that situations when this DVD recording/reproducing operation is performed are substantially identical to the situations during the DVD recording/reproducing operation described in the embodiment 1.

Next, when the CD recording/reproducing operation is carried out, in addition to the structure of the embodiment 2, only the PBS 13e is merely provided on an optical path along which laser light emitted from a laser light source is traveled. Since the PBS 13e has the property capable of passing therethrough the CD light 5b employed in this CD recording/reproducing operation, this situation is equivalent to such a fact that this optical element is not present, as viewed from the CD light 5b. As a consequence, the optical element is merely increased which passes the light when the CD recording/reproducing operation is carried out, so that situations when this CD recording/reproducing operation is performed are substantially identical to the situations during the CD recording/reproducing operation described in the embodiment 1.

Figure 20:
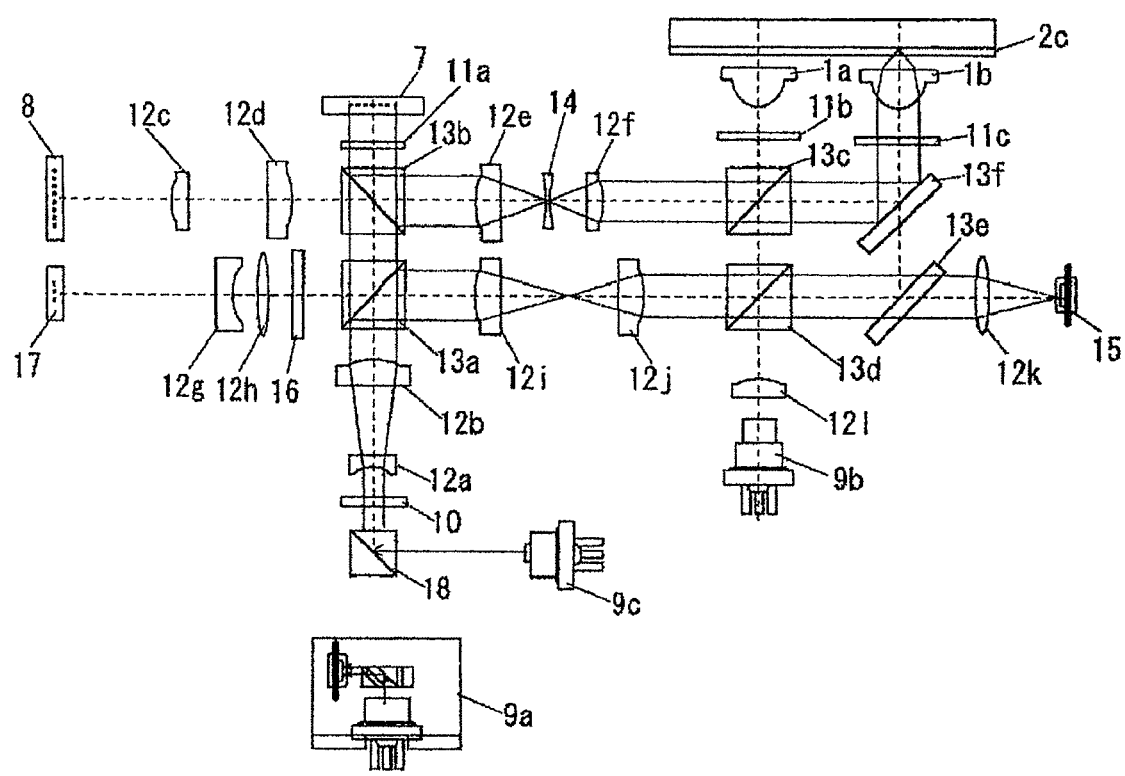
FIG. 20 is a diagram for indicating an optical system and optical axes of a going path in such a case that when a BD recording/reproducing operation is performed in the hologram recording/reproducing operation having the compatibility with the bit-by-bit recording operation, BD light passes through the optical path of the information light during the hologram recording operation so as to perform the BD recording/reproducing operation.
Figure 21:
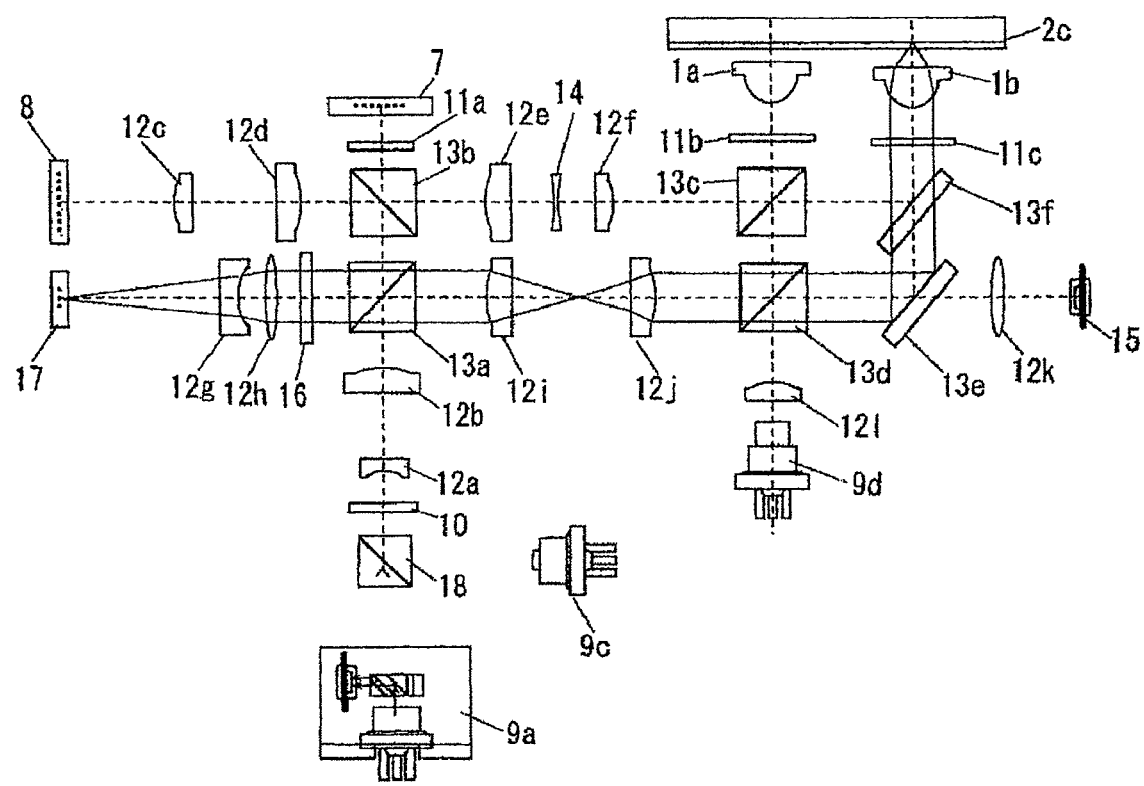
FIG. 21 is a diagram for indicating an optical system and optical axes of a returning path in such a case that when a BD recording/reproducing operation is performed in the hologram recording/reproducing operation having the compatibility with the bit-by-bit recording operation, BD light passes through the optical path of the information light during the hologram recording operation so as to perform the BD recording/reproducing operation.

Subsequently, a description is made of operations of a BD recording/reproducing operation with reference to FIG. 20 and FIG. 21 while utilizing the optical path for the information light when the hologram recording/reproducing operation is carried out. FIG. 20 is a diagram for indicating an optical system and optical axes of a going path in such a case that BD light passes through the optical path of the information light during the hologram recording operation so as to perform a BD recording/reproducing operation when the BD recording/reproducing operation is performed in the hologram recording/reproducing apparatus having the compatibility with respect to the bit-by-bit recording operation. FIG. 21 is a diagram for indicating an optical system and optical axes of a returning path in such a case that BD light passes through the optical path of the information light during the hologram recording operation so as to perform the BD recording/reproducing operation when the BD recording/reproducing operation is performed in the hologram recording/reproducing apparatus having the compatibility with respect to the bit-by-bit recording operation.

In FIG. 20, the laser light emitted from the laser light source 9c is entered to the L.C.HWP 10 under ON status. The laser light which is held only the S-polarized light when this laser light was emitted from the laser light source 9c will also have P-polarized light by the L.C.HWP 10. As a result, the S-polarized light is reflected on the PBS 13a, and the P-polarized light passes through the PBS 13a; which are branched to two optical paths. The laser light having the S-polarized light reflected on the PBS 13a is penetrated through the lenses 12i and 12j so as to become a proper beam diameter, and thereafter, the processed S-polarized light passes through the PBS 13d, and then, is entered to the PBS 13e. The laser light which has passed through the PBS 13e is entered to the front light monitor 15 by the lens 12k so as to read a light amount of this entered laser light, and then, the read light amount is employed so as to control a light amount of laser light emitted from the light source 9c.

On the other hand, the laser light of the P-polarized light which has passed through the PBS 13a also passes through the PBS 13b, and this P-polarized light is converted into circularly polarized light by the QWP 11a, and thereafter, the circularly polarized light reaches the SLM 7. In this case, the SLM 7 is not especially required to apply two-dimensional data to the laser light, but the SLM 7 is required to merely reflect the reached laser light. The laser light reflected by the SLM 7 again passes through the QWP 11a, so that the circularly polarized light is converted to S-polarized light; the S-polarized light is reflected by the PBS 13b, and then, the reflected S-polarized light is processed by the lenses 12e and 12f so as to become a proper beam diameter; and thereafter, the S-polarized light passes through the PBS 13c, and then, is entered to the PBS 13f. The laser light entered into the PBS 13f is reflected by this PBS 13f, and is converted into circularly polarized light by the QWP 11b, and thereafter, the circularly polarized light is collected to the recording medium 2c by the objective lens 1b so as to record/read information with respect to the recording medium 2a.

In FIG. 21, the laser light reflected on the reflection plane of the recording medium 2c passes through the objective lens 1b, and thereafter, is processed by the QWP 11c so as to be converted from the circularly polarized light to P-polarized light; the P-polarized light passes through the PBS 13f, and is reflected by the PBS 13e, and then, the reflected P-polarized light is penetrated through the lenses 12i and 12j so as to form the P-polarized light having a proper beam diameter after passing through the PBS 13d; and thereafter, the P-polarized light passes through the PBS 13a, and then, is collected to the PDIC 17 via the transmission type diffraction optical element 16 and the lenses 12h and 12g. Various sorts of servo control operations and a signal detection for recorded information are carried out based upon the laser light read by the PIDC 17.

As previously described, the DVD-purpose light source is employed when the hologram recording operation is carried out, whereas in such a case that the BD recording/reproducing operation is carried out, a first optical path routed via the optical spatial modulating unit 7 to be employed in the hologram recording operation is employed in the major optical path defined from the light source 9c to the recording medium 2c, and also, a second optical path routed not via the optical spatial modulating unit 7 to be employed in the hologram recording operation is employed in the major optical path through which the light reflected from the recording medium 2c reaches the PDIC 17. As a consequence, while the light source is defined as a starting point, the optical paths used in the recording operations are commonly utilized in the BD recording operation and the hologram recording operation, so that such a recording/reproducing apparatus can be readily realized. That is, the recording/reproducing apparatus has compatibility capable of commonly utilizing the optical systems in a high efficiency, while there are many optical systems which can be commonly utilized in the hologram recording operation and the BD recording operation. As a result, even in a recording/reproducing apparatus capable of realizing both a hologram recording operation and a BD recording operation by employing optical paths for two systems (namely, information light and reference light), the entire recording/reproducing apparatus can be largely made compact, as compared with such a case that both the hologram recording operation and the BD recording operation are realized by employing separate optical systems.

Figure 22:
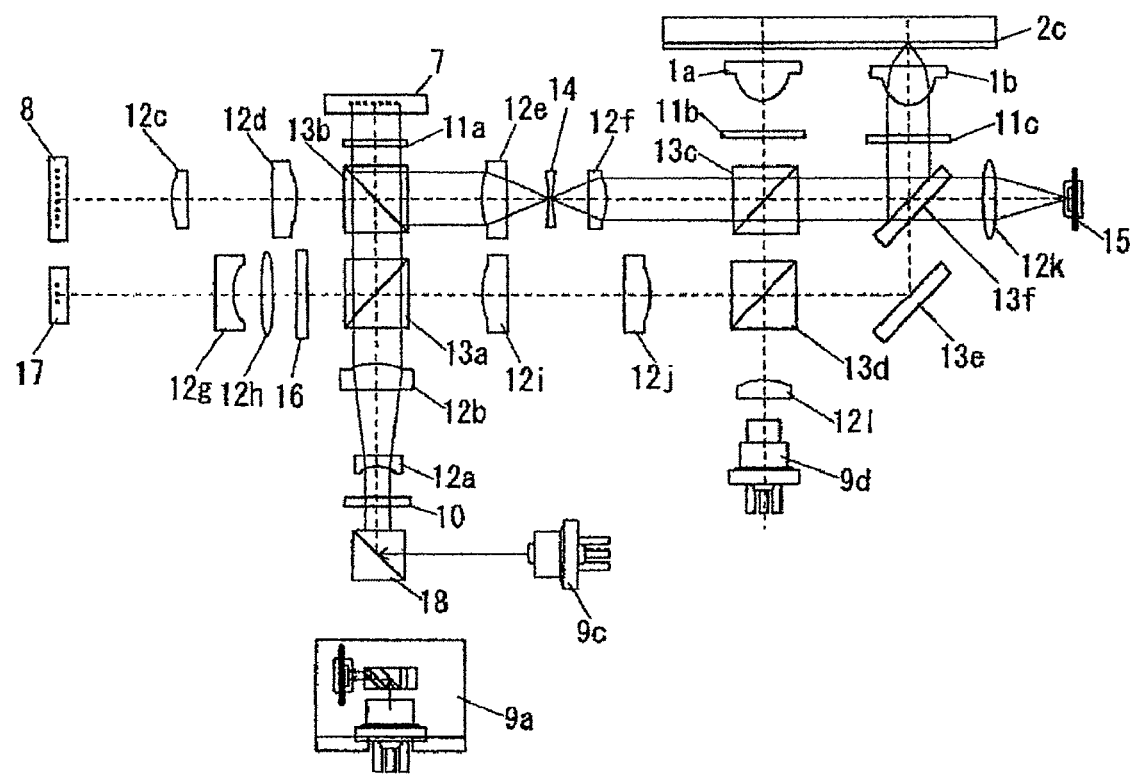
FIG. 22 is a diagram for indicating optical axes in such a case that when a BD recording/reproducing operation is performed in the hologram recording/reproducing operation having the compatibility with the bit-by-bit recording operation, an optical system is changed when BD light passes through the optical path of the reference light during the hologram recording operation so as to perform the BD recording/reproducing operation.

For example, the front light monitor 15 provided in order to control the light amount of the laser light emitted from the light source 9c may be alternatively installed at such a position, as shown in FIG. 22, located in front of a place where a partial light portion of the laser light reflected by the SLM 7 has passed through the PBS 13c, and the PBS 13f.

In this alternative case, it is no longer required to branch the laser light emitted from the light source 9c along the two directions by the PBS 13a. Thus, the laser light emitted from the light source 9c is converted to P-polarized light by the L.C.HWP 10, the P-polarized light passes through the PBS 13a, and then, passes through the optical path for the information light when the hologram recording operation is carried out.

As a consequence, the laser light emitted from the light source 9c when the BD recording/reproducing operation is carried out passes through only the optical path of the information light when the hologram recording operation is performed, so that the laser light emitted from the light source 9c can be employed in a higher efficiency.

It should be understood that when the front light monitor 15 is located at such a position as shown in FIG. 22, in order to sense a light amount of CD-purpose laser light 5b, the PBS 13d and the PBS 13c must have such an optical characteristic with respect to the CD-purpose laser light. That is, the PBS 13d must pass the S-polarized light and must reflect the P-polarized light; and the PBS 13c must reflect the S-polarized light having a predetermined ratio of light amounts and must pass the remaining amount of this S-polarized light, and further, must pass the P-polarized light. Also, the PBS 13f must pass therethrough both the DVD-light 5a and the CD-light 5b, must pass therethrough a partial light portion of the S-polarized light of the BD light 5c, and must reflect the remaining light portion thereof, and further must pass therethrough the P-polarized light of the BD light 5c.

Also, in FIG. 22, since the PBS 13e merely reflects the BD light 5c, this PBS 13e may be alternatively replaced by simply employing a mirror.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-271170 filed on Oct. 18, 2007, the contents of which are incorporated herein for reference.

What is claimed is:

1. A recording apparatus for recording interference fringes on a recording medium by interfering information light with reference light, comprising:
    a first light source which irradiates first laser light for a DVD recording operation;
    a second light source which irradiates second laser light for a CD recording operation;
    an optical spatial modulating unit which applies information to the first laser light; and
    an objective lens which collect the first laser light and the second laser light at different positions on the same optical axis,
    wherein in case of a hologram recording operation, the hologram recording operation is carried out by employing a first optical path and a second optical path, information light to which the information is applied via the optical spatial modulating unit is produced from the first laser light and the produced information light is conducted to the objective lens along the first optical path, and reference light is produced without routing the optical spatial modulating unit from the first laser light and the produced reference light is conducted to the objective lens along the second optical path, and at the same time, an address/servo control operation is carried out by employing a third optical path along which the second laser light is conducted to the objective lens;
    wherein in case of the DVD recording operation, the DVD recording operation is carried out by employing the second optical path; and
    wherein in case of the CD recording operation, the CD recording operation is carried out by employing the third optical path.

2. The recording apparatus according to claim 1, wherein the objective lens collects the first laser light on the side of the objective lens rather than the second laser light.

3. The recording apparatus according to claim 2, wherein a diffraction grating is formed on the objective lens;
    wherein the second laser light is collected without being influenced by the diffractive grating;
    wherein the first laser light is diffracted by the diffraction grating so that the first laser light becomes diffraction light; and
    wherein the diffraction light is collected on the side of the objective lens rather than the collected position of the second laser light.

4. The recording apparatus according to claim 2, wherein the objective lens has a first refraction region and a second refraction region;
    wherein a first diffractive grating for diffracting the second laser light is formed in the first refraction region;
    wherein a second diffractive grating for diffracting the first laser light is formed in the second refraction region;

wherein the second laser light passed through the second refraction region is collected without being influenced by the second diffraction grating;

wherein the first laser light passed through the second diffraction region becomes diffraction light by the second diffractive grating; and wherein the diffraction light is collected on the side of the objective lens rather than the light collection position of the second laser light which has passed through the second refraction region.

5. The recording apparatus according to claim 4, wherein a refractive index of the second refraction region is set so that the first laser light passed through the first refraction region is collected without being influenced by the first diffraction grating in accordance with the refractive index of the first refraction region, and the first laser light passed through the first refraction region is collected at the same collection position as that of the first laser light passed through the second refraction region.

6. The recording apparatus according to claim 5, wherein the second laser light passed through the first refraction region becomes diffraction light by the first diffraction grating so that the diffraction light is diffused without being collected.

7. The recording apparatus according to claim 1, further comprising:
a third light source which irradiates Blue-ray laser light; and
a second objective lens which collect the Blue-ray laser light,
wherein the Blue-ray laser light is conducted to the second objective lens via the second optical path.

8. An information processing appliance comprising the recording apparatus recited in claim 1.

9. A recording apparatus for recording interference fringes on a recording medium by interfering information light with reference light, comprising:
a first light source which irradiates first laser light for a DVD recording operation;
a second light source which irradiates second laser light for a CD recording operation;
an optical spatial modulating unit which applies information to the first laser light; and
an objective lens which collect the first laser light and the second laser light at different positions on the same optical axis,
wherein in case of a hologram recording operation, the hologram recording operation is carried out by employing a first optical path and a second optical path, information light to which the information is applied via the optical spatial modulating unit is produced from the first laser light and the produced information light is conducted to the objective lens along the first optical path, and reference light is produced without routing the optical spatial modulating unit from the first laser light and the produced reference light is conducted to the objective lens along the second optical path, and at the same time, an address/servo control operation is carried out by employing a third optical path along which the second laser light is conducted to the objective lens;
wherein in case of the DVD recording operation, the DVD recording operation is carried out by employing the first optical path; and
wherein in case of the CD recording operation, the CD recording operation is carried out by employing the third optical path.

10. A recording apparatus according to claim 9, wherein the objective lens collects the first laser light on the side of the objective lens rather than the second laser light.

11. The recording apparatus according to claim 10, wherein a diffraction grating is formed on the objective lens;
wherein the second laser light is collected without being influenced by the diffractive grating;
wherein the first laser light is diffracted by the diffraction grating so that the first laser light becomes diffraction light; and
wherein the diffraction light is collected on the side of the objective lens rather than the collected position of the second laser light.

12. The recording apparatus according to claim 10, wherein the objective lens has a first refraction region and a second refraction region;
wherein a first diffractive grating for diffracting the second laser light is formed in the first refraction region;
wherein a second diffractive grating for diffracting the first laser light is formed in the second refraction region;
wherein the second laser light passed through the second refraction region is collected without being influenced by the second diffraction grating;
wherein the first laser light passed through the second diffraction region becomes diffraction light by the second diffractive grating; and
wherein the diffraction light is collected on the side of the objective lens rather than the light collection position of the second laser light which has passed through the second refraction region.

13. The recording apparatus according to claim 12, wherein a refractive index of the second refraction region is set so that the first laser light passed through the first refraction region is collected without being influenced by the first diffraction grating in accordance with the refractive index of the first refraction region, and the first laser light passed through the first refraction region is collected at the same collection position as that of the first laser light passed through the second refraction region.

14. The recording apparatus according to claim 13, wherein the second laser light passed through the first refraction region becomes diffraction light by the first diffraction grating so that the diffraction light is diffused without being collected.

15. The recording apparatus according to claim 9, further comprising:
a third light source which irradiates Blue-ray laser light; and
a second objective lens which collect the Blue-ray laser light,
wherein the Blue-ray laser light is conducted to the second objective lens via the first optical path.

16. A recording apparatus for recording interference fringes on a recording medium by interfering information light with reference light, comprising:
a first light source which irradiates first laser light;
a second light source which irradiates second laser light, and is different in wavelength from the first light source;
an optical spatial modulating unit which applies information to the first laser light; and
an objective lens which collect the first laser light and the second laser light at different positions on the same optical axis, wherein the objective lens collects the first laser light on the side of the objective lens rather than the second laser light;

wherein in case of a first recording system, the first recording system is carried out by employing a first optical path and a second optical path, information light to which the information is applied via the optical spatial modulating unit is produced from the first laser light and the produced information light is conducted to the objective lens along the first optical path, and reference light is produced without routing the optical spatial modulating unit from the first laser light and the produced reference light is conducted to the objective lens along the second optical path, and at the same time, an address/servo control operation is carried out by employing a third optical path along which the second laser light is conducted to the objective lens;

wherein in case of a second recording system, the second recording system is carried out by employing either the first optical path or the second optical path; and wherein in case of a third recording system, the third recording system is carried out by employing the third optical path.

17. The recording apparatus according to claim 16, wherein the first recording system is a hologram recording system;

wherein the second recording system is a DVD recording system; and wherein the third recording system is a CD recording system.

* * * * *